US012718612B2

(12) United States Patent
Matsuo

(10) Patent No.: US 12,718,612 B2
(45) Date of Patent: Aug. 25, 2026

(54) INFORMATION PROCESSING SYSTEM, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Yoshie Matsuo, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/182,459

(22) Filed: Mar. 13, 2023

(65) Prior Publication Data

US 2024/0071120 A1 Feb. 29, 2024

(30) Foreign Application Priority Data

Aug. 31, 2022 (JP) ................................. 2022-137774

(51) Int. Cl.
*G06V 30/416* (2022.01)
*G06V 30/412* (2022.01)

(52) U.S. Cl.
CPC .......... *G06V 30/416* (2022.01); *G06V 30/412* (2022.01)

(58) Field of Classification Search
None
See application file for complete search history.

(56) References Cited

U.S. PATENT DOCUMENTS 9,015,153 B1 * 4/2015 Zhang ..................... G06F 40/40 707/723
9,349,115 B2 * 5/2016 Friedman ............... G06Q 10/10
9,734,228 B2 * 8/2017 Barrett .................. G06F 16/283
10,192,127 B1 * 1/2019 Hall ...................... G06V 30/412
10,380,165 B2 * 8/2019 Haddon .................. G06F 16/48
10,419,351 B1 * 9/2019 Baldi ...................... H04L 45/38
10,678,997 B2 * 6/2020 Ahuja .................... G06N 20/20
10,866,981 B2 * 12/2020 Haddon ................. G16H 40/20
2015/0286860 A1 * 10/2015 Ruiz-Tapiador ... H04N 1/00331 382/112
2016/0378859 A1 * 12/2016 Banik .................. G06Q 10/103 707/708
2018/0060317 A1 * 3/2018 Haddon .................. G06F 16/43

FOREIGN PATENT DOCUMENTS

JP 2019-133719 A 8/2019
JP 2021-012741 A 2/2021
JP 2022-011034 A 1/2022

OTHER PUBLICATIONS

Feb. 17, 2026 Office Action issued in Japanese Patent Application No. 2022-137774.

* cited by examiner

*Primary Examiner* — Anand P Bhatnagar
(74) *Attorney, Agent, or Firm* — Oliff PLC

(57) ABSTRACT

An information processing system includes at least one processor configured to: acquire an extraction candidate from recorded information serving as information recorded in an atypical document, the extraction candidate serving as a candidate to be extracted as the recorded information corresponding to an item of the atypical document; and display a recorded area on a display, the recorded area being where the extraction candidate is recorded in the atypical document.

16 Claims, 21 Drawing Sheets

FIG. 7

| PRIORITY LEVEL | CHARACTER STRING | COORDINATES (X,Y) | CONDITION ACHIEVEMENT STATUS | | |
|---|---|---|---|---|---|
| | | | KEY | INDICATION FORMAT | DATE PERIOD |
| 1 | NOVEMBER 8, 2021 | 114,536 | OK | OK | NG |
| 2 | JULY 19, 1987 | 49,185 | NG | OK | OK |
| 3 | 7−31 | 91,197 | NG | NG | NG |
| 4 | 04992−1−6232 5/15/2021 | 54,225 | NG | NG | NG |

30A
310
311
312
300
330
ITEM
SCANNED IMAGE/READ RESULT
APPLICATION DATE
NOVEMBER 8, 2021
331
NOVEMBER 8, 2021
332
CANDIDATE
CONFIRM
333
334
○○○○○ APPLICATION
APPLICATION DATE
NOVEMBER 8, 2021
PRONUNCIATION
E-I-KO SA-I-TO-U
FULL NAME
EIKO SAITO
BIRTHDATE
JULY 19, 1987
SEX
MALE
FEMALE
ADDRESS
YAMATO BUILDING 1F, 67-31 KAWAI, KAMINAKASHIMA, TOKYO
TELEPHONE NO.
04992-1-6232
5/15/2021
ADJUST TO FULL SCREEN

FIG. 17

INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-137774 filed Aug. 31, 2022.

BACKGROUND

(i) Technical Field

The present disclosure relates to information processing systems, information processing methods, and non-transitory computer readable media.

(ii) Related Art

Japanese Unexamined Patent Application Publication No. 2021-12741 describes an image processing apparatus including a character-string recognition unit and an output unit. The character-string recognition unit recognizes a character string of a specific item in a target image to be recognized based on a result of learning using multiple images including character strings. The output unit outputs the target image to be recognized and the character-string recognition result obtained by the character-string recognition unit in a state where a correspondence relationship indicating the same specific item between the target image to be recognized and the character-string recognition result is ascertainable.

SUMMARY

In a case where recorded information recorded in an atypical document is extracted, it is possible to ascertain an extraction area of this atypical document by displaying, on a display, the area of the atypical document from which the recorded information is extracted together with the extracted recorded information.

For example, the recorded information is sometimes extracted from an area not intended by the user. In this case, in order to correct the extraction result, the user may search for an intended area in the atypical document or input intended recorded information.

Aspects of non-limiting embodiments of the present disclosure relate to enhanced workability for a user when correcting an extraction result, as compared with a configuration where a recorded area having recorded therein a candidate to be extracted is not displayed when recorded information recorded in an atypical document is to be extracted.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system comprising at least one processor configured to: acquire an extraction candidate from recorded information serving as information recorded in an atypical document, the extraction candidate serving as a candidate to be extracted as the recorded information corresponding to an item of the atypical document; and display a recorded area on a display, the recorded area being where the extraction candidate is recorded in the atypical document.

BRIEF DESCRIPTION OF THE DRAWINGS

Exemplary embodiments of the present disclosure will be described in detail based on the following figures, wherein:

FIG. 7 illustrates an example where priority levels are allocated to extraction candidates;

FIG. 17 is a flowchart illustrating the flow of a process where the OCR processing server according to this exemplary embodiment learns an extraction result;

DETAILED DESCRIPTION

Exemplary embodiments of the present disclosure will be described below with reference to the appended drawings.

Exemplary Embodiments

Information Processing System 1

Figure 1:
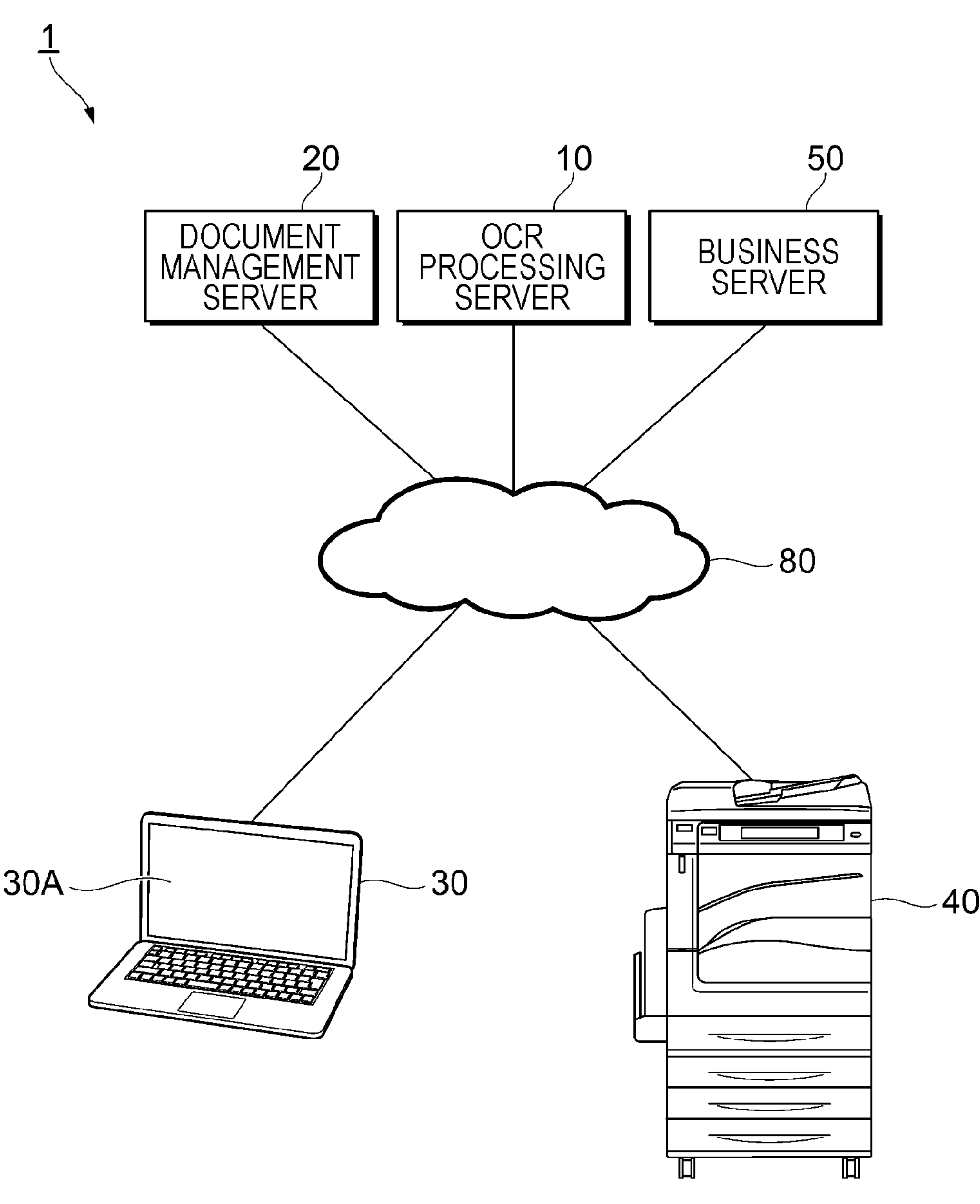
FIG. 1 illustrates an overall configuration example of an information processing system according to an exemplary embodiment.

FIG. 1 illustrates an overall configuration example of an information processing system 1 according to an exemplary embodiment.

The information processing system 1 according to this exemplary embodiment includes an optical-character-recognition (OCR) processing server 10 and a user terminal 30 that are connected to each other via a communication line 80. The OCR processing server 10 performs OCR processing on image data of an atypical document. The user terminal 30 is operated by a user. The communication line 80 is, for example, the Internet and is used for information communication between the OCR processing server 10 and the user terminal 30.

The information processing system 1 may also include a document management server 20 that manages a user's document, an image forming apparatus 40 having a document reading function, and a business server 50 serving as an output destination for the OCR processing result of the atypical-document image data.

In this exemplary embodiment, the term "atypical document" refers to a business document not having preliminarily set therein an area from which information recorded in the business document is to be extracted or the meaning of the information to be extracted. The atypical document may be a business document in which input fields are not uniform and includes, for example, an application, a bill, an invoice, or a sales slip. The input fields in the atypical document may have text handwritten therein or text printed therein.

Other examples of the atypical document include an office document created using an application program, such as office software, an electronic mail, image data optically read from an original document, a facsimile document, a photograph, accounting data, medical data, and a database. The atypical document is not limited to a still image and may include a moving image. The still image may include a graphic image or a picture.

The OCR processing server 10 according to this exemplary embodiment performs OCR processing on the atypical-document image data and recognizes text recorded in the atypical document. The OCR processing server 10 extracts a text-data candidate corresponding to a specific item in the atypical document from the atypical-document image data. In other words, from recorded information serving as information recorded in the atypical document, the OCR processing server 10 acquires a candidate (referred to as "extraction candidate" hereinafter) to be extracted as recorded information corresponding to an item in the atypical document.

As an alternative to the information processing system 1 shown in FIG. 1 in which the OCR processing server 10 is a single server, the OCR processing server 10 may include multiple servers. The OCR processing server 10 may be a so-called cloud server or may be an on-premises server.

The user terminal 30 according to this exemplary embodiment is an information terminal apparatus used by the user for checking the OCR processing result obtained by the OCR processing server 10. The user terminal 30 presents the extraction candidate acquired by the OCR processing server 10 and receives, from the user, an operation for confirming the OCR processing result as well as an operation for inputting a correction command. The user terminal 30 displays an area (referred to as "recorded area" hereinafter) where the extraction candidate is recorded in the atypical document.

The user terminal 30 is provided with a display 30A formed of a liquid crystal display panel or an organic electroluminescence (EL) display panel that displays an image and text information to the user.

The user terminal 30 may be, for example, a computer, a tablet information terminal, a smartphone, or another type of information processing apparatus.

The document management server 20 according to this exemplary embodiment manages image data of a target document that is to undergo OCR processing. The document management server 20 inputs the managed image data to the OCR processing server 10.

The image forming apparatus 40 according to this exemplary embodiment at least has a scanning function for reading a document and acquires image data of the document, such as a paper medium. The image forming apparatus 40 inputs the acquired image data to the OCR processing server 10. The image forming apparatus 40 may also have, for example, a printing function, a copying function, and a facsimile function.

In this exemplary embodiment, each of the document management server 20 and the image forming apparatus 40 is an example of an input apparatus that inputs target image data that is to undergo OCR processing to the OCR processing server 10.

The business server 50 is responsible for performing a specific business operation by using the OCR processing result obtained by the OCR processing server 10. The business server 50 manages client information and calculates expenses based on the OCR processing result.

In this exemplary embodiment, the business server 50 is an example of an output destination to which the OCR processing server 10 outputs the OCR processing result of the atypical-document image data.

The overview of the information processing system 1 according to this exemplary embodiment will now be described.

The OCR processing server 10 performs OCR processing on atypical-document image data input from, for example, the document management server 20, the user terminal 30, or the image forming apparatus 40 and outputs the OCR processing result to a predetermined output destination, such as the business server 50.

In the OCR processing server 10, a read definition setting process, an output setting process, or a business check setting process is performed, the atypical-document image data is divided based on an extraction candidate, and confirmation and correction of the extraction candidate is received.

The read definition setting process involves setting a read range serving as a range from which information about image data is to be read in OCR processing, and includes, for example, reading an item value from a right region of an item. The output setting process involves setting a file format of output data to be output, as well as an output destination. The business check setting process involves setting the format, such as the number of text characters, inputtable to the output data.

If the user terminal 30 receives, from the user, a command for extracting recorded information corresponding to a specific item from the atypical-document image data, extraction by the OCR processing server 10 is requested, and display related to this extraction result is performed. The user terminal 30 displays, on the display 30A, a candidate for the recorded information corresponding to the specific item in the atypical document. In detail, with regard to the candidate for the recorded information corresponding to the specific item, the user terminal 30 displays, on the display 30A, a recorded area of text data serving as the extracted recorded information.

Accordingly, when the user uses the user terminal 30 to correct the extraction result obtained by the OCR processing server 10, the user refers to the recorded area of the presented extraction candidate.

This exemplary embodiment involves displaying the extraction candidate in correspondence with the recorded information and the recorded area before the extraction result obtained by the OCR processing server 10 is confirmed, thereby achieving enhanced workability for the user when correcting the extraction result.

Hardware Configuration

Figure 2:
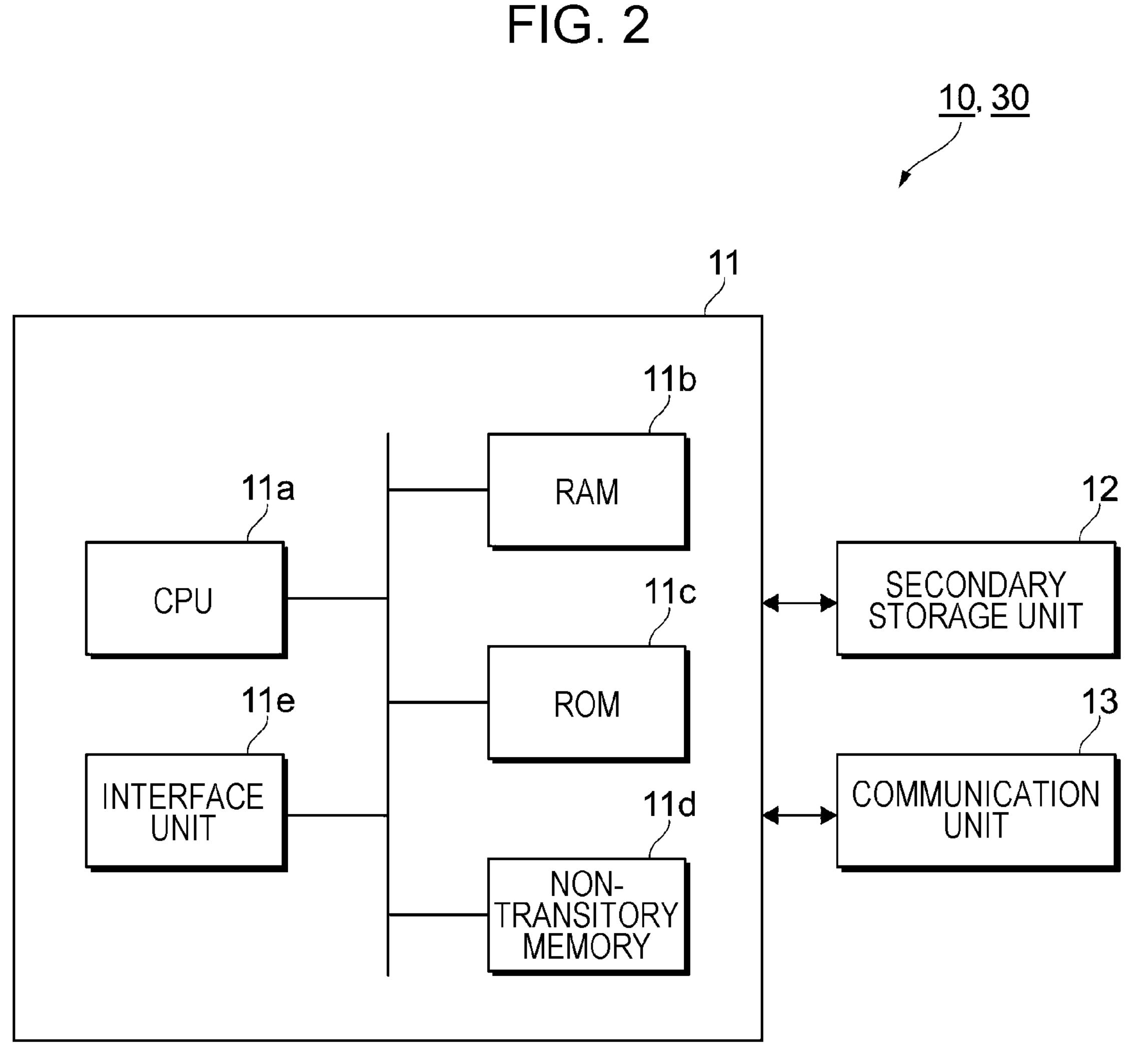
FIG. 2 illustrates a configuration example of an optical-character-recognition (OCR) processing server and a user terminal according to an exemplary embodiment.

FIG. 2 illustrates a configuration example of the OCR processing server 10 and the user terminal 30 according to this exemplary embodiment.

Each of the OCR processing server 10 and the user terminal 30 according to this exemplary embodiment includes a controller 11 that controls the overall operation of the apparatus, a secondary storage unit 12 where atypical-document-related information is stored, and a communication unit 13 that exchanges information via the communication line 80 (see FIG. 1).

The controller 11, the secondary storage unit 12, and the communication unit 13 are connected via a bus or a signal line.

The controller 11 includes a central processing unit (CPU) 11*a* serving as an example of a processor that controls the entire apparatus, a random access memory (RAM) 11*b* used as a working memory of the CPU 11*a*, and a read-only memory (ROM) 11*c* where, for example, a program to be executed by the CPU 11*a* is stored. The controller 11 includes a rewritable non-transitory memory 11*d* capable of retaining data even when the power supply is cut off, and an interface unit 11*e* for controlling each unit, such as the communication unit 13, connected to the controller 11.

The non-transitory memory 11*d* is constituted of, for example, a flash memory or a static random access memory (SRAM) backed up by a battery. The controller 11 reads a program stored in the secondary storage unit 12, so that each process is executed in each apparatus according to this exemplary embodiment.

The secondary storage unit 12 is constituted of, for example, a hard disk drive (HDD) or a semiconductor memory. The secondary storage unit 12 varies depending on the product type of each apparatus. The secondary storage unit 12 has stored therein, for example, atypical-document-related information. In addition, the secondary storage unit 12 has stored therein a program to be executed by the controller 11, as well as information about an extraction condition for OCR processing.

The user terminal 30 includes an input device, such as a keyboard and/or a mouse, and the display 30A (not shown in FIG. 2) constituted of a liquid crystal display panel. If the input device in the user terminal 30 is a touchscreen, the touchscreen may be provided integrally with the display 30A.

Functional Configuration of OCR Processing Server 10

Figure 3:
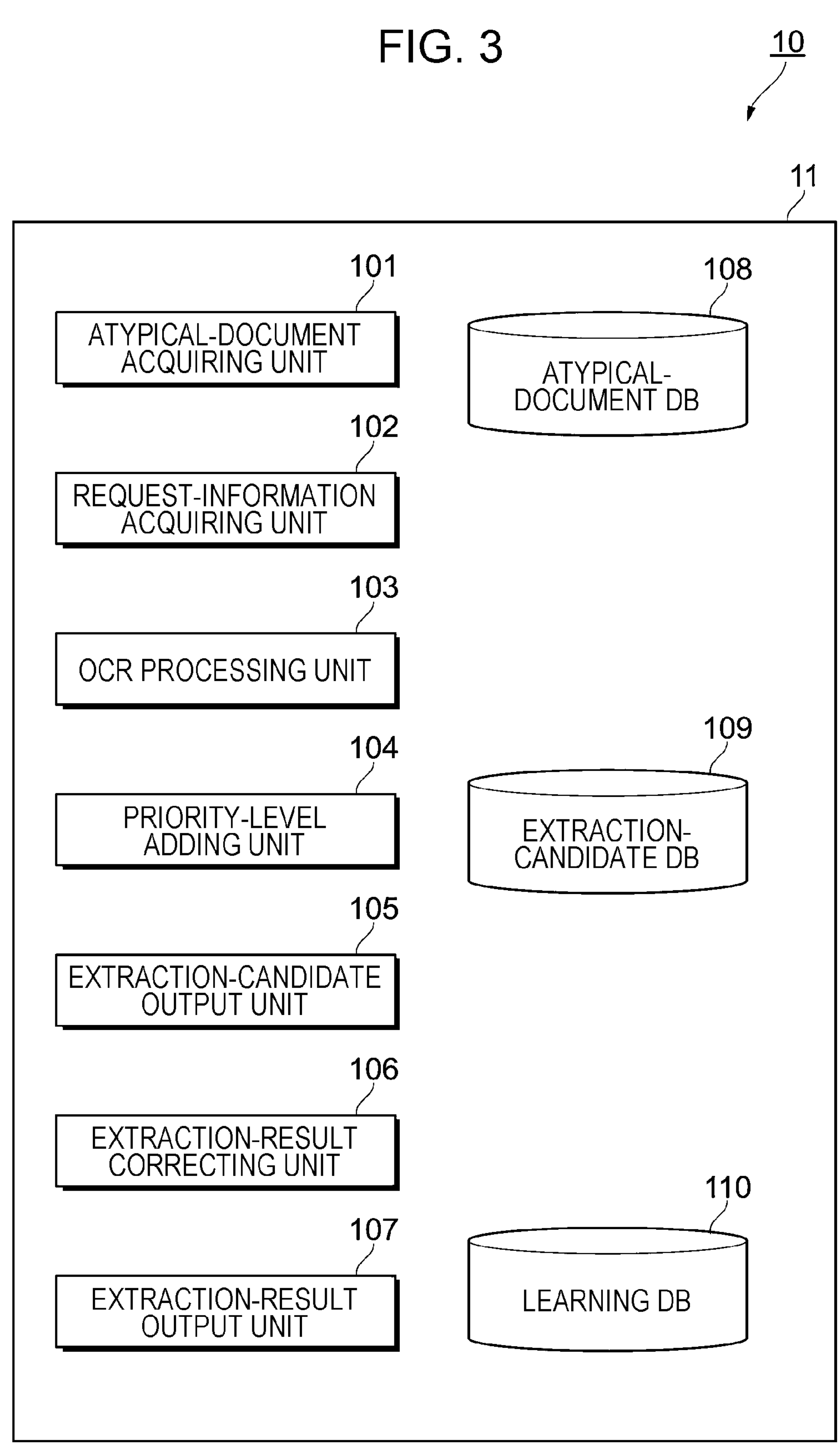
FIG. 3 illustrates an example of a functional configuration of the OCR processing server according to this exemplary embodiment.

FIG. 3 illustrates an example of a functional configuration of the OCR processing server 10 according to this exemplary embodiment. The functions of the OCR processing server 10 shown in FIG. 3 are implemented substantially by the CPU 11*a* of the controller 11.

As shown in FIG. 3, the OCR processing server 10 includes an atypical-document acquiring unit 101, a request-information acquiring unit 102, an OCR processing unit 103, a priority-level adding unit 104, an extraction-candidate output unit 105, an extraction-result correcting unit 106, and an extraction-result output unit 107. The OCR processing server 10 also includes an atypical-document database (DB) 108, an extraction-candidate DB 109, and a learning DB 110.

The atypical-document acquiring unit 101 acquires atypical-document image data. The atypical-document acquiring unit 101 acquires the atypical-document image data from the secondary storage unit 12 of the apparatus or from the communication unit 13 that has received the atypical-document image data from a second apparatus. Examples of the second apparatus include the document management server 20, the user terminal 30, and the image forming apparatus 40.

The atypical-document acquiring unit 101 stores the acquired atypical-document image data in the atypical-document DB 108.

The request-information acquiring unit 102 acquires request information indicating a user request via the user terminal 30 used by the user. In detail, the request-information acquiring unit 102 allows the user to input the request via the user terminal 30 and acquires the request information input by the user via the communication line 80.

The method by which the request-information acquiring unit 102 acquires the request information is not limited to the above-described method.

The OCR processing unit 103 executes a character recognition process on the atypical-document image data to extract recorded information included in the atypical document.

The OCR processing unit 103 extracts the recorded information requested by the user as an extraction candidate based on the recorded content of the item with respect to the requested recorded information.

In this exemplary embodiment, an item recorded in the atypical document may sometimes be referred to as "key", and recorded information corresponding to an item may sometimes be referred to as "value". In other words, a key is an item name, and a value is an item value.

As mentioned above, the OCR processing unit 103 executes a character recognition process on the atypical-document image data to perform key-value extraction for extracting a key and a value.

For example, an atypical document often has recorded therein text indicating a full name corresponding to a value near a key "full name". If an item "full name" is selected, the OCR processing unit 103 identifies text "full name" corresponding to the key from the atypical-document image data, and extracts recorded information corresponding to the value from near an area where this "full name" is identified. Moreover, if the item "full name" is selected, the OCR processing unit 103 may also extract recorded information corresponding to the value from near an area where a "name" with a meaning similar to "full name" is identified.

Based on an extraction condition set for an item, the OCR processing unit 103 may also extract an extraction candidate value from the recorded information corresponding to the area where the key is identified.

An extraction condition set for an item is information that limits the type or format of a value corresponding to a key and serves as a hint when an extraction candidate value is to be identified.

In detail, the extraction condition is set such that the contents of a value include, for example, a date, telephone number, postal code, birthdate, numerical value, full name, and pronunciation of the full name.

Furthermore, the extraction condition is set such that the indication of a value includes, for example, a Western calendar year, Japanese calendar year, month and date, numerical value larger than or equal to n or smaller than or equal to n, Chinese character, Japanese Hiragana character, Japanese Katakana character, and alphabet character.

The priority-level adding unit 104 adds a priority level to each extraction candidate based on a reliability level of OCR processing.

In detail, the priority-level adding unit 104 allocates a priority level to each extraction candidate based on an achievement status of the extraction condition set for the item. The priority-level adding unit 104 may allocate a priority level to each extraction candidate based on the area where the key is identified.

The extraction-candidate output unit 105 outputs, to the user terminal 30, information related to the extraction candidate extracted by the OCR processing unit 103.

In detail, the extraction-candidate output unit 105 outputs extraction-candidate-value-related information including the recorded information, the recorded area, and the priority level to the user terminal 30 via the communication unit 13.

The extraction-result correcting unit 106 corrects the extraction candidate corresponding to the extraction result based on the request information acquired by the request-information acquiring unit 102. In other words, the extraction-result correcting unit 106 changes information related to an extraction candidate at priority level 1 extracted by the OCR processing unit 103 based on the request information acquired by the request-information acquiring unit 102.

In detail, the extraction-result correcting unit 106 corrects the extraction candidate to change at least one of the priority level, the recorded information, and the recorded area. Accordingly, the corrected content is reflected on the extraction result obtained by the OCR processing unit 103.

The extraction-result output unit 107 manages the extraction result obtained by the OCR processing unit 103.

The extraction-result output unit 107 outputs the extraction result obtained by the OCR processing unit 103 to the secondary storage unit 12 or the user terminal 30 of the apparatus, or to another apparatus. The extraction-result output unit 107 outputs an extraction candidate output as priority level 1 by the extraction-candidate output unit 105 or an extraction candidate corrected by the extraction-result correcting unit 106 as the extraction result obtained by the OCR processing unit 103.

The extraction-result output unit 107 stores the content output as the extraction result obtained by the OCR processing unit 103 into the learning DB 110. Moreover, if the content output as the extraction result obtained by the OCR processing unit 103 has been changed from the content of the extraction candidate output as priority level 1 by the extraction-candidate output unit 105, the extraction-result output unit 107 stores this changed content into the learning DB 110.

The atypical-document DB 108 stores and accumulates the atypical-document image data acquired by the atypical-document acquiring unit 101.

The extraction-candidate DB 109 stores the extraction candidate extracted by the OCR processing unit 103. In detail, the extraction-candidate DB 109 stores and accumulates the key and the value extracted as a result of OCR processing in association with each other.

The learning DB 110 stores and accumulates the extraction result obtained by the OCR processing unit 103 and output by the extraction-result output unit 107. In detail, if the extraction result has been corrected, the learning DB 110 stores and accumulates, as the extraction result, not only the value but also information about the extraction condition corresponding to the value among the area where the key is identified, the positional relationship between the key and the value, and the extraction condition set for the item.

Functional Configuration of User Terminal 30

Figure 4:
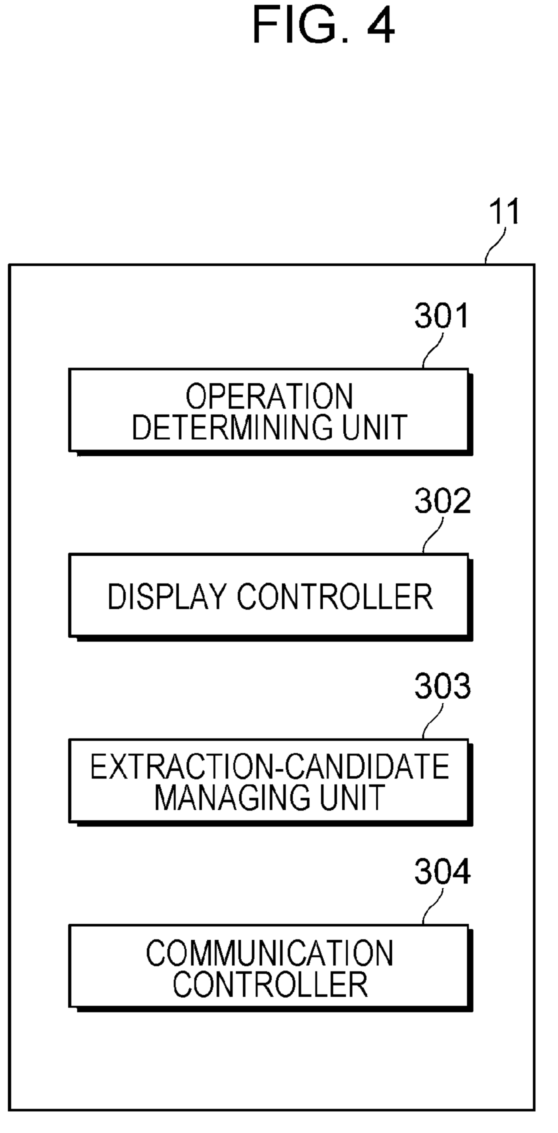
FIG. 4 illustrates an example of a functional configuration of the user terminal according to this exemplary embodiment.

FIG. 4 illustrates an example of a functional configuration of the user terminal 30 according to this exemplary embodiment. The functions of the user terminal 30 shown in FIG. 4 are implemented substantially by the CPU 11*a* of the controller 11.

As shown in FIG. 4, the user terminal 30 includes an operation determining unit 301, a display controller 302, an extraction-candidate managing unit 303, and a communication controller 304.

The operation determining unit 301 determines whether or not a user operation has been performed on the user terminal 30 via, for example, the input device. Examples of the user operation include an operation for selecting an item from which recorded information is to be extracted from atypical-document image data, an operation for setting an extraction condition for each item, and an operation for selecting an extraction result.

The display controller 302 controls, for example, the display mode on the display 30A.

In detail, the display controller 302 controls the display mode of an operation screen that presents an extraction candidate displayed on the display 30A. For example, the display controller 302 controls the display mode of the operation screen so as to indicate the recorded area of the extraction candidate in the atypical document.

The extraction-candidate managing unit 303 manages information related to the presentation of the extraction candidate. In other words, the extraction-candidate managing unit 303 manages information to be used by the display controller 302.

Examples of the information to be managed by the extraction-candidate managing unit 303 include information in which recorded information and a recorded area of an extraction candidate are associated with each other, information indicating a priority level allocated to each extraction candidate, and the details of an achievement status of an extraction condition for each extraction candidate.

The communication controller 304 processes information transmitted by the communication unit 13 as well as received information.

The communication controller 304 requests the OCR processing server 10 via the communication unit 13 to extract recorded information corresponding to an item and to correct an extraction result.

Furthermore, the communication controller 304 extracts information for presenting an extraction candidate on the operation screen and extracts information about an extraction result from information transmitted from the OCR processing server 10 via the communication unit 13. In other words, the communication controller 304 processes acquired information and performs determination.

Checking Process of Extraction Candidate

A processing example where an extraction result is output after allowing the user to check an extraction candidate will now be described.

Figure 5:
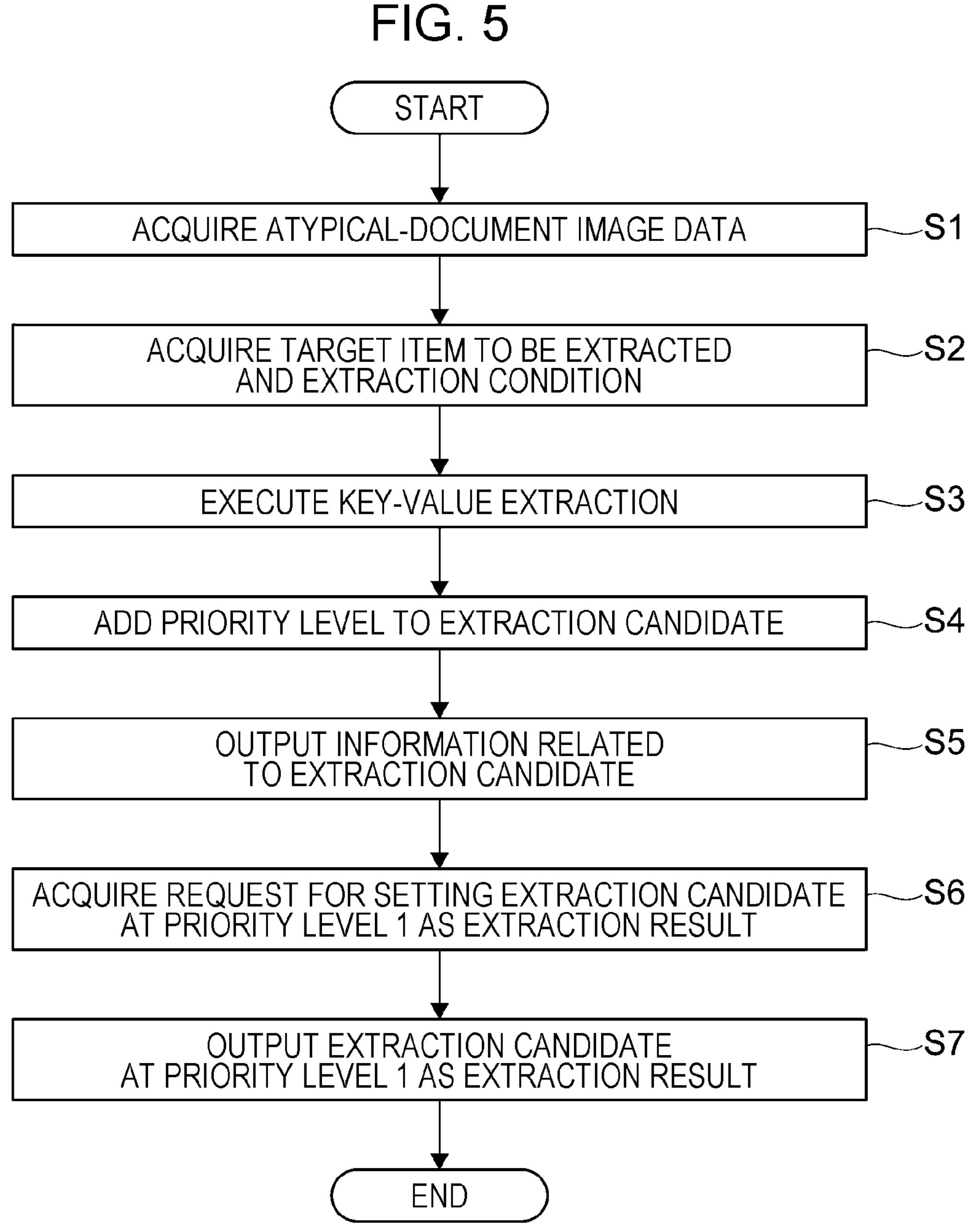
FIG. 5 is a flowchart illustrating the flow of a process where the OCR processing server according to this exemplary embodiment allows a user to check an extraction candidate.

FIG. 5 is a flowchart illustrating the flow of a process where the OCR processing server 10 according to this exemplary embodiment allows the user to check an extraction candidate.

The example in FIG. 5 relates to a case where the user is allowed to check, via the user terminal 30, an extraction candidate extracted from atypical-document image data by the OCR processing server 10.

In step S1, the atypical-document acquiring unit 101 of the OCR processing server 10 acquires atypical-document image data.

The atypical document from which the image data is acquired by the atypical-document acquiring unit 101 is displayed as a preview image on the display 30A of the user terminal 30. The user terminal 30 receives a command from the user for setting a target item to be extracted and an extraction condition with respect to OCR processing of the atypical-document image data acquired by the atypical-document acquiring unit 101.

The following description relates to a screen that receives, from the user, settings for target items to be extracted and extraction conditions with respect to OCR processing of the atypical-document image data.

Figure 6:
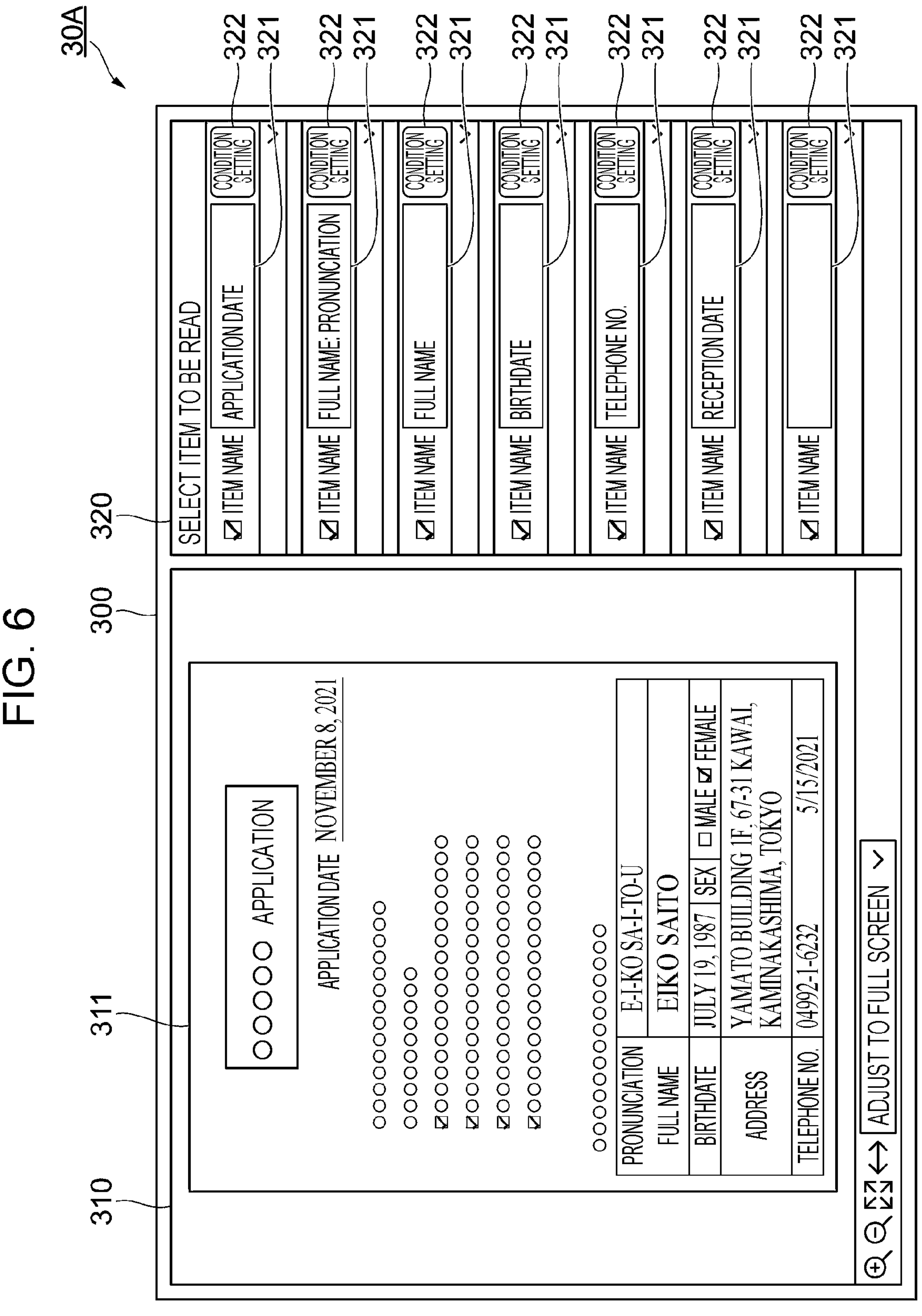
FIG. 6 illustrates a display example of a display of the user terminal according to this exemplary embodiment.

FIG. 6 illustrates a display example of the display 30A of the user terminal 30 according to this exemplary embodiment, and shows an example of a setting screen that receives settings for the target items to be extracted and the extraction conditions with respect to OCR processing.

The display 30A of the user terminal 30 displays an operation screen 300 that receives a user operation for commanding the OCR processing server 10 to perform OCR processing.

The operation screen 300 includes a preview screen 310 that displays an atypical-document preview image 311 and a setting screen 320 that receives settings for the target items to be extracted in OCR processing.

In the display example shown in FIG. 6, the setting screen 320 displays item setting images 321 and condition setting images 322.

Each item setting image 321 is an image that receives, from the user, a setting for a target item name to be extracted.

In the display example shown in FIG. 6, item names "application date", "full name: pronunciation", "full name", "birthdate", "telephone number", and "reception date" are set in the item setting images 321 as targets to be extracted.

With regard to each target item name to be extracted, an appropriate item name may be selected from predetermined item-name candidates, or text information may be input. Furthermore, as mentioned above, a setting may be received for each item name such that a key having a similar meaning but displayed differently is also extracted.

Each condition setting image 322 is an image that receives, from the user, a setting for an extraction condition for the corresponding item. For example, if one of the condition setting images 322 is selected by the user, a screen that receives the details of the extraction condition for the corresponding item is displayed, so as to receive a setting for limiting the type or format of a value corresponding to a key.

In step S2, the request-information acquiring unit 102 of the OCR processing server 10 acquires, from the user terminal 30, the target items to be extracted and the extraction conditions with respect to OCR processing of the atypical-document image data acquired by the atypical-document acquiring unit 101. In other words, the request-information acquiring unit 102 acquires, from the user terminal 30, request information indicating the target items to be extracted and the extraction conditions for OCR processing.

Then, in step S3, the OCR processing unit 103 of the OCR processing server 10 executes key-value extraction on the atypical-document image data based on the request information acquired by the request-information acquiring unit 102.

In detail, for example, it is requested from the user terminal 30 that the item name "application date" be extracted as a key and that text data indicating a date on or after the 15th of every month or a Western calendar year be extracted as a value. In this case, the OCR processing unit 103 extracts an extraction candidate using recorded information around an area where the text of the item name "application date" is identified, recorded information indicating a date on or after the 15th, or recorded information indicating the Western calendar year as a value.

In step S4, the priority-level adding unit 104 of the OCR processing server 10 adds priority levels to extraction candidates serving as results of key-value extraction by the OCR processing unit 103.

In detail, the priority-level adding unit 104 allocates the priority levels to the extraction candidates based on the achievement status of the request information transmitted from the user terminal 30.

The priority levels added to the extraction candidates by the priority-level adding unit 104 will now be described.

FIG. 7 illustrates an example where the priority levels are allocated to the extraction candidates.

The example shown in FIG. 7 relates to a case where the item name "application date" is requested as a key, and the recorded information indicating a date on or after the 15th of every month or a Western calendar year as an extraction condition set for the item is requested as a value.

In the example shown in FIG. 7, "priority level", "character string" extracted as a value, "coordinates" indicating the recorded area in the atypical document, and "condition achievement status" indicating whether or not the request information is satisfied are associated with each other for each extraction candidate.

For "key" of "condition achievement status", "OK" is reflected if the recorded area of the value is near the area where the text of the key is identified, and "NG" is reflected if the recorded area of the value is not near the area where the text of the key is identified. In "indication format", it is indicated whether or not the year is indicated in the Western calendar format. "OK" is reflected if the year is indicated in the Western calendar format, and "NG" is reflected if the year is not indicated in the Western calendar format. In "date period", it is indicated whether or not the date is on or after the 15th of every month. "NG" is reflected if the date is prior to the 15th, and "OK" is reflected if the date is on or after the 15th.

In this processing example, the priority levels are allocated such that an extraction candidate that has achieved more conditions included in the request information is prioritized over an extraction candidate that has achieved fewer conditions. Furthermore, the priority levels are allocated such that an extraction candidate in which the recorded area of the value is near the area where the text of the key is identified is prioritized over an extraction candidate in which the recorded area of the value is not near the area where the text of the key is identified.

For example, a character string “Nov. 8, 2021” has achieved the most conditions included in the request information and is recorded near the area where the text of the key is identified. Therefore, “priority level 1” is allocated to this character string such that this character string is prioritized over other extraction candidates.

Furthermore, for example, a character string “Jul. 19, 1987” has achieved the same number of conditions as the character string “Nov. 8, 2021”, but is not recorded near the area where the text of the key is identified. Therefore, “priority level 2” is allocated to the character string “Jul. 19, 1987” such that this character string is prioritized subsequently to the character string “Nov. 8, 2021”.

Moreover, for example, a character string “7-31” and a character string “04992-1-6232 5/15/2021” have not achieved the conditions included in the request information, so that the number of conditions achieved is smaller than that of the character string “Nov. 8, 2021” and the character string “Jul. 19, 1987”. Therefore, “priority level 3” and “priority level 4” are allocated to the character string “7-31” and the character string “04992-1-6232 5/15/2021”, respectively, from information not set as the request information by the user.

Subsequently, in step S5, the extraction-candidate output unit 105 of the OCR processing server 10 outputs extraction-candidate-related information to the user terminal 30.

The extraction-candidate-related information output by the extraction-candidate output unit 105 is displayed on the display 30A of the user terminal 30 so as to be checked by the user. While presenting the extraction candidate, the user terminal 30 receives, from the user, a command for confirming the extraction result.

Display for allowing the user to check the extraction-candidate-related information will now be described.

Figure 8:
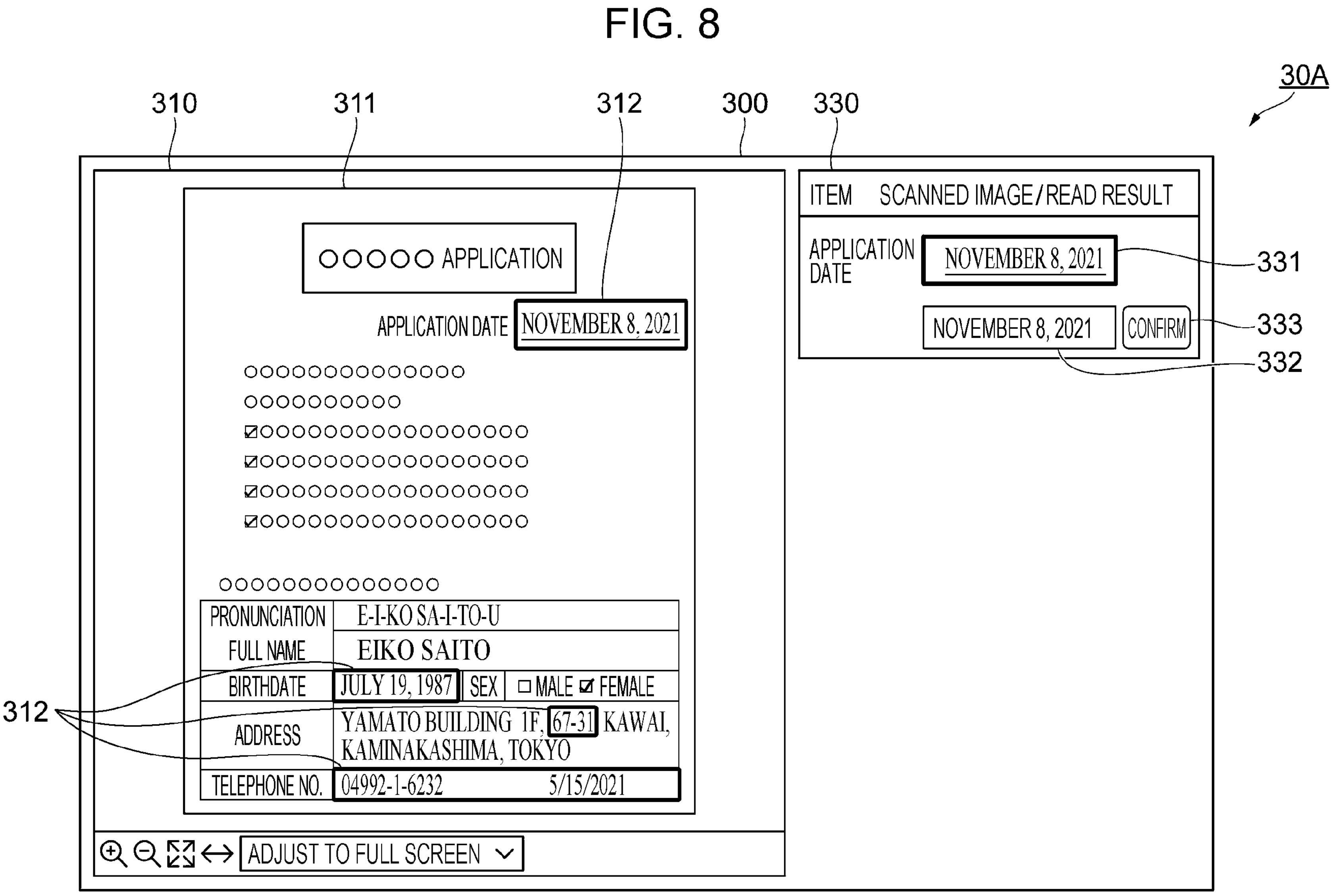
FIG. 8 illustrates an example of extraction-candidate display in accordance with this exemplary embodiment.

FIG. 8 illustrates an example of extraction-candidate display in accordance with this exemplary embodiment, and shows an example of a detailed screen for presenting the details of the extraction-candidate-related information to the user.

The example shown in FIG. 8 relates to a case where the extraction candidates shown in FIG. 7 are extracted.

In the display example shown in FIG. 8, the operation screen 300 includes a detailed screen 330 for presenting the details of the extraction-candidate-related information to the user, in addition to the preview screen 310 displaying the atypical-document preview image 311. In the preview image 311, highlight images 312 are displayed. The detailed screen 330 has displayed therein a partial image 331, and an output field 332, and a confirm button image 333.

Each highlight image 312 highlights the recorded area of the corresponding extraction candidate. In the display example shown in FIG. 8, each highlight image 312 is added to surround a region from which one extraction candidate is extracted from the atypical-document preview image 311.

The highlight images 312 are not limited to images that surround the recorded areas of the extraction candidates, and may be, for example, arrow images or pop-up images including text messages.

In the display example shown in FIG. 8, the detailed screen 330 displays information related to an extraction candidate to which “priority level 1” is allocated and that has achieved the most conditions requested by the user among the extraction candidates.

The detailed screen 330 presents the details of the extraction-candidate-related information to the user and receives, from the user, a command for confirming the extraction result obtained by the OCR processing unit 103.

Alternatively, a command for changing the extraction candidate whose information is displayed on the detailed screen 330 may be received from the user based on an operation for selecting one of the highlight images 312 on the preview image 311.

The partial image 331 is a partial image of the recorded area of the extraction candidate in the atypical document image.

The output field 332 displays text data to be output as a value. The output field 332 may an input from the user for correcting of the text data.

The confirm button image 333 receives, from the user, a command for confirming the extraction candidate displayed on the detailed screen 330 as the extraction result obtained by the OCR processing unit 103. When the confirm button image 333 is selected by the user, the user terminal 30 requests the OCR processing server 10 to confirm the extraction result.

In this processing example, it is assumed that the confirm button image 333 is selected by the user in a state where the extraction candidate to which “priority level 1” is allocated is displayed on the detailed screen 330.

In step S6, the request-information acquiring unit 102 of the OCR processing server 10 acquires, from the user terminal 30, a request for setting the extraction candidate at priority level 1 as the extraction result. In other words, the request-information acquiring unit 102 acquires, from the user terminal 30, request information indicating a request for setting the extraction candidate at priority level 1 as the extraction result.

Then, in step S7, the extraction-result output unit 107 of the OCR processing server 10 outputs the extraction candidate at priority level 1 as the extraction result based on the request information acquired by the request-information acquiring unit 102, and ends the process.

The extraction-candidate display in accordance with this exemplary embodiment is not limited to a case where the extraction-candidate-related information is displayed based on priority levels or the recorded areas of the extraction candidates are uniformly displayed, as shown in FIG. 8. Other examples of the extraction-candidate display will be described below.

Figure 9:
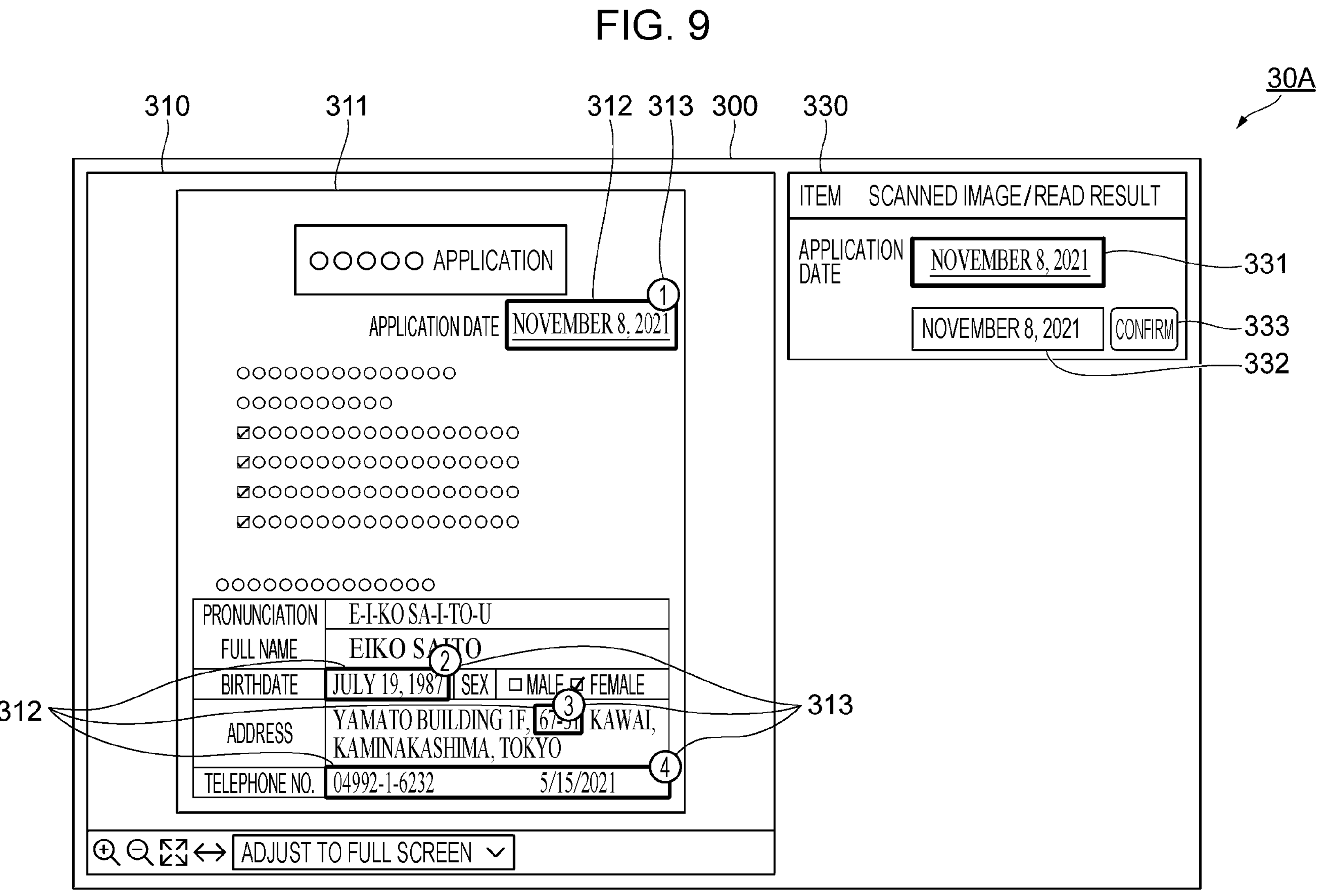
FIG. 9 illustrates another example of the extraction-candidate display in accordance with this exemplary embodiment.

FIG. 9 illustrates another example of the extraction-candidate display in accordance with this exemplary embodiment, and shows an example where the priority levels allocated to the respective extraction candidates.

The example shown in FIG. 9 relates to a case where the priority levels allocated to the respective extraction candidates are reflected on the atypical-document preview image 311.

In the display example shown in FIG. 9, badge images 313 that use small badge-like marks to notify the user of the priority levels allocated to the respective extraction candidates are displayed in addition to the highlight images 312 that highlight the recorded areas of the extraction candidates.

Each badge image 313 is displayed in association with the recorded area of the corresponding extraction candidate. Accordingly, this may enable enhanced workability for the user who selects any of the extraction candidates from the recorded areas on the preview image 311.

The badge images 313 are not limited to being displayed on the preview image 311. A badge image 313 may also be displayed in the detailed screen 330. Accordingly, the user is allowed to check the extraction-candidate-related information on the detailed screen 330 while referring to the priority level.

The badge images 313 are used for informing the user about the priority levels allocated to the respective extraction candidates. In other words, the badge images 313 are used for directly informing the user about the priority levels.

The badge images 313 are not limited to being displayed using numerical values shown in FIG. 9, and may be displayed using graphic symbols.

Next, reasons for the priority levels allocated to the respective extraction candidates will be described with reference to the display of extraction candidates reflected on the atypical-document preview image 311.

Figure 10:
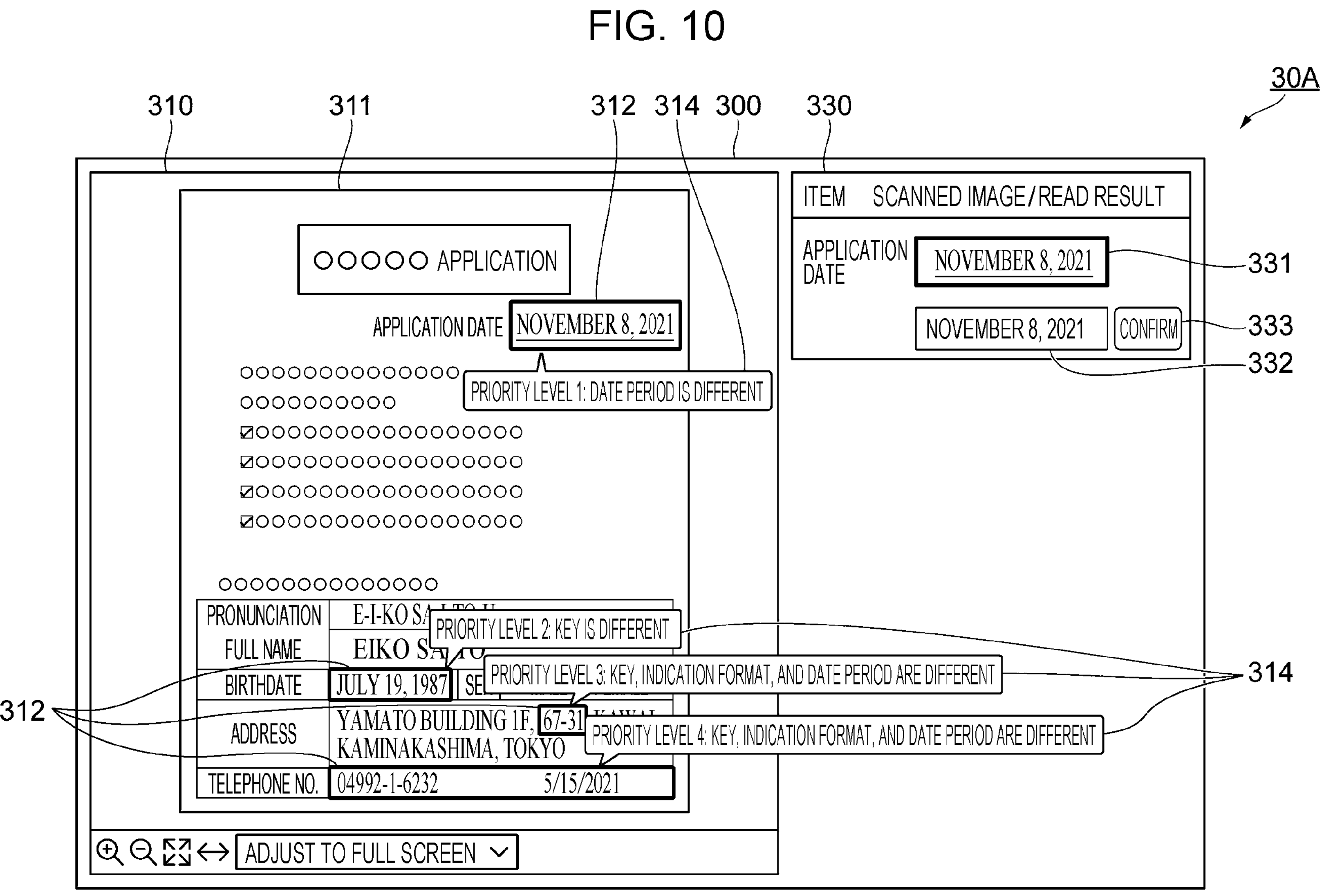
FIG. 10 illustrates another example of the extraction-candidate display in accordance with this exemplary embodiment.

FIG. 10 illustrates another example of the extraction-candidate display in accordance with this exemplary embodiment, and shows an example where the reasons for the priority levels are displayed.

In the display example shown in FIG. 10, reference images 314 that the user refers to about the reasons for the priority levels allocated to the extraction candidates are displayed in addition to the highlight images 312 that highlight the recorded areas of the extraction candidates.

Each reference image 314 is displayed in association with the recorded area of the corresponding extraction candidate. A reference image 314 may also be displayed in the detailed screen 330.

The reference images 314 are used for informing the user about the reasons for the priority levels allocated to the respective extraction candidates. In other words, the reference images 314 are used for informing the user about the details of the priority levels.

The reference images 314 are not limited to being used for presenting conditions not achieved by the extraction candidates shown in FIG. 10, and may be used for presenting conditions achieved by the extraction candidates. Each reference image 314 is not limited to being used for presenting the details of the achievement status of a condition, such as "priority level 1: date period is different", and may be used for presenting the overview of the achievement status of a condition, such as "priority level 1: one of conditions is not achieved".

The reference images 314 are not limited to pop-up images including text messages, and may be displayed using graphic symbols.

The display mode of the highlight images 312 that highlight the recorded areas of the extraction candidates may be varied depending on the priority levels allocated to the respective extraction candidates.

Figure 11:
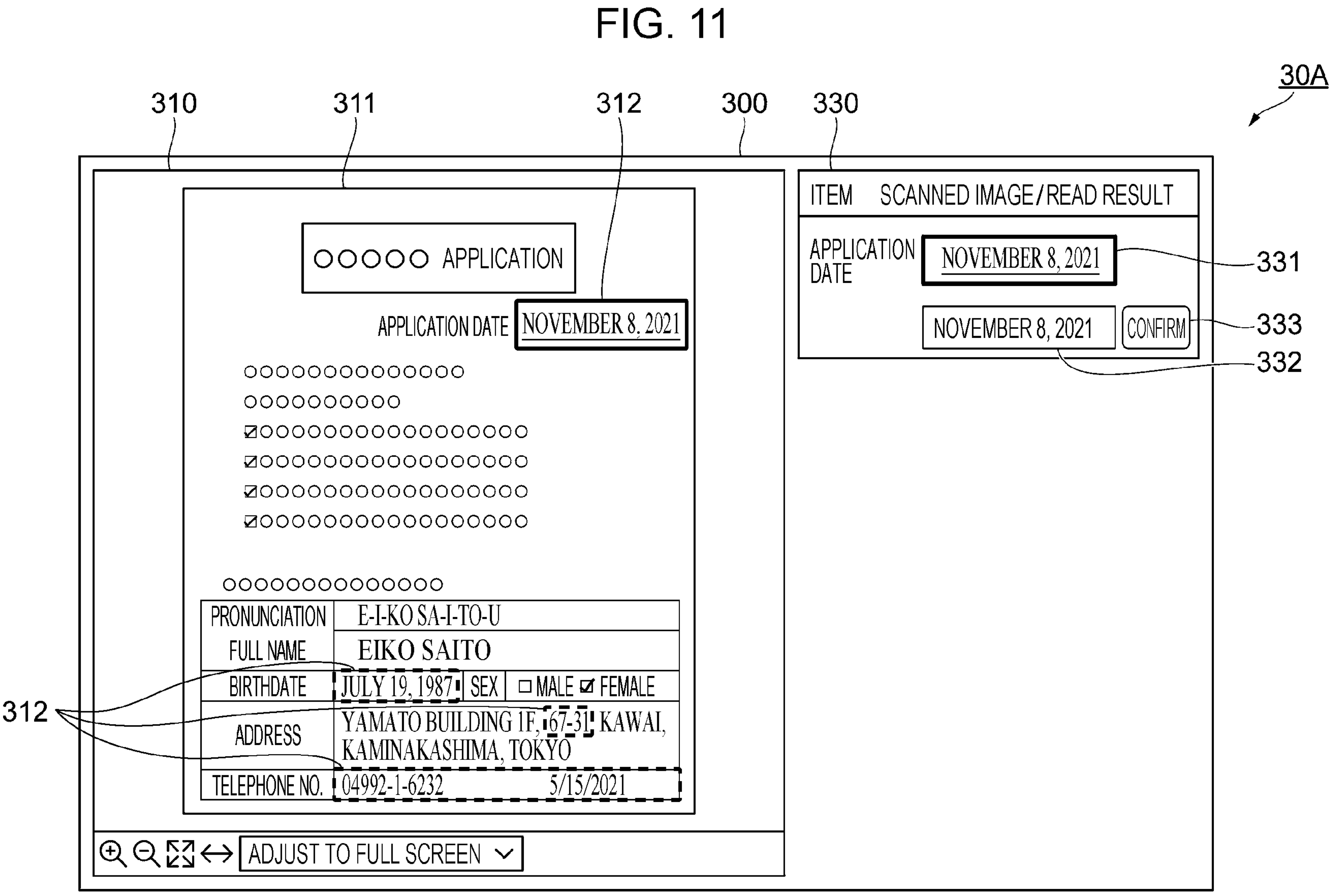
FIG. 11 illustrates another example of the extraction-candidate display in accordance with this exemplary embodiment.

FIG. 11 illustrates another example of the extraction-candidate display in accordance with this exemplary embodiment, and shows an example where the display mode of the highlight images 312 is varied depending on the priority levels.

In the display example shown in FIG. 11, the highlight images 312 are displayed in accordance with the priority levels of the extraction candidates corresponding to the recorded areas indicated by the highlight images 312.

The display mode of the highlight images 312 is varied between the extraction candidate at priority level 1 and the other extraction candidates. In detail, of the multiple extraction candidates, the display mode of the highlight images 312 indicating the recorded areas of the extraction candidates is varied between the candidate that has achieved the most extraction conditions and the other candidates.

In the display example shown in FIG. 11, the highlight image 312 corresponding to the extraction candidate at priority level 1 is displayed with a solid line, whereas the highlight images 312 corresponding to the other extraction candidates are each displayed with a dashed line. Alternatively, for example, between the extraction candidate at priority level 1 and the other extraction candidates, the display mode of the highlight images 312 may be varied in the form of a blinking mode and a lit mode or in the form of red and blue, or may be varied in image shape.

Furthermore, the display mode of the highlight images 312 may be varied in accordance with the respective priority levels instead of being separated into the extraction candidate at priority level 1 and the other extraction candidates.

Furthermore, a warning may be displayed for an extraction candidate satisfying a specific condition.

Figure 12:
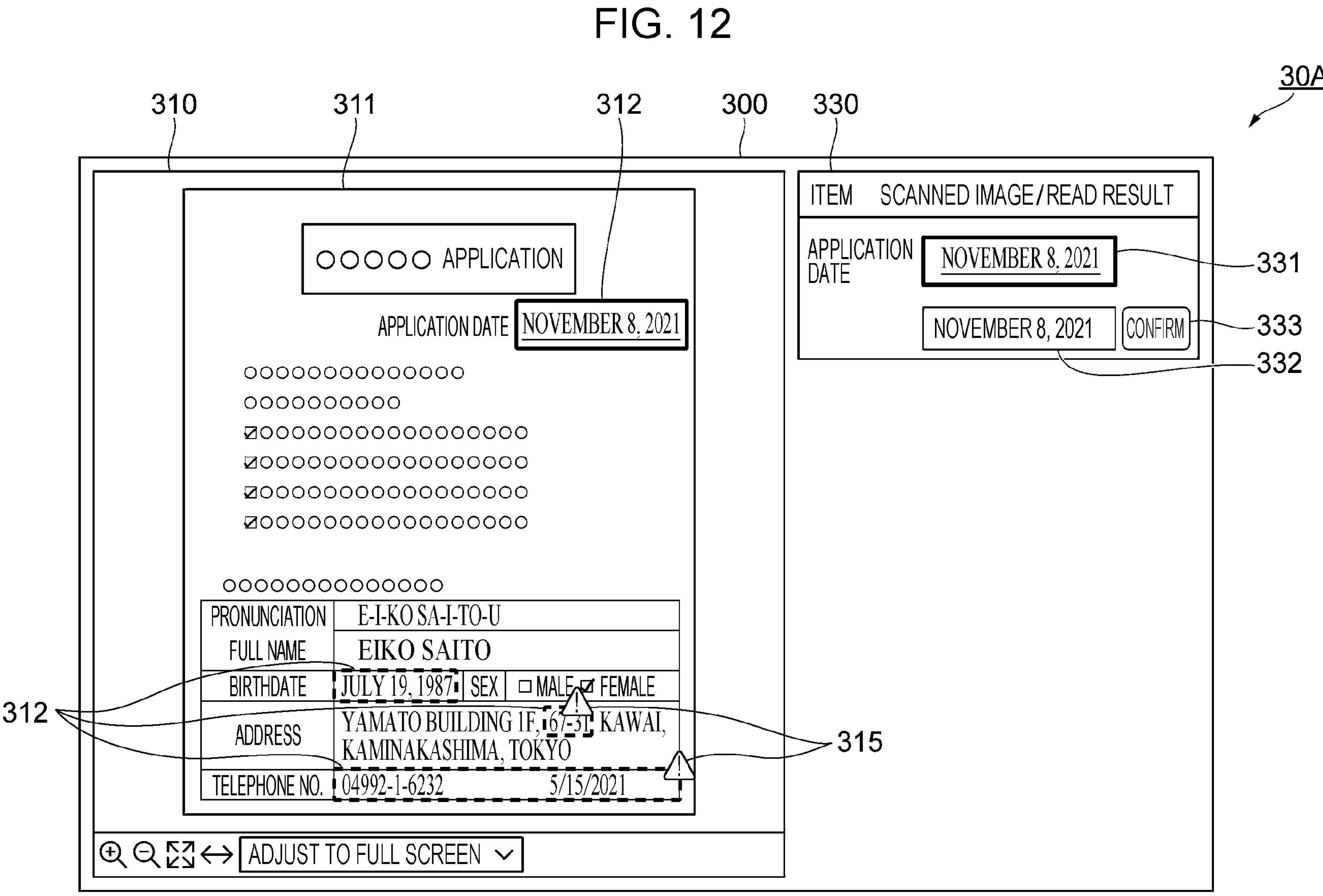
FIG. 12 illustrates another example of the extraction-candidate display in accordance with this exemplary embodiment.

FIG. 12 illustrates another example of the extraction-candidate display in accordance with this exemplary embodiment, and shows an example where a warning is displayed in accordance with the achievement status of an extraction condition.

In the display example shown in FIG. 12, warning images 315 that warn the user about extraction candidates satisfying a specific condition are displayed in addition to the highlight images 312 that highlight the recorded areas of the extraction candidates.

The warning images 315 are displayed in association with the recorded areas of the extraction candidates. A warning image 315 may also be displayed in the detailed screen 330.

The warning images 315 are used for informing the user about the extraction candidates satisfying the specific condition. In detail, each warning image 315 is used for informing the user about an extraction candidate whose number of conditions achieved is smaller than a threshold value or an extraction candidate that has not achieved a predetermined condition.

The warning images 315 are not limited to graphic symbols and may alternatively be pop-up images including text messages.

As an alternative to the above example in which the extraction-candidate display according to this exemplary embodiment includes any of the badge images 313, the reference images 314, and the warning images 315 in addition to the highlight images 312, any of the badge images 313, the reference images 314, and the warning images 315 or a combination of all of the above may be displayed in addition to the highlight images 312.

Figure 13A:
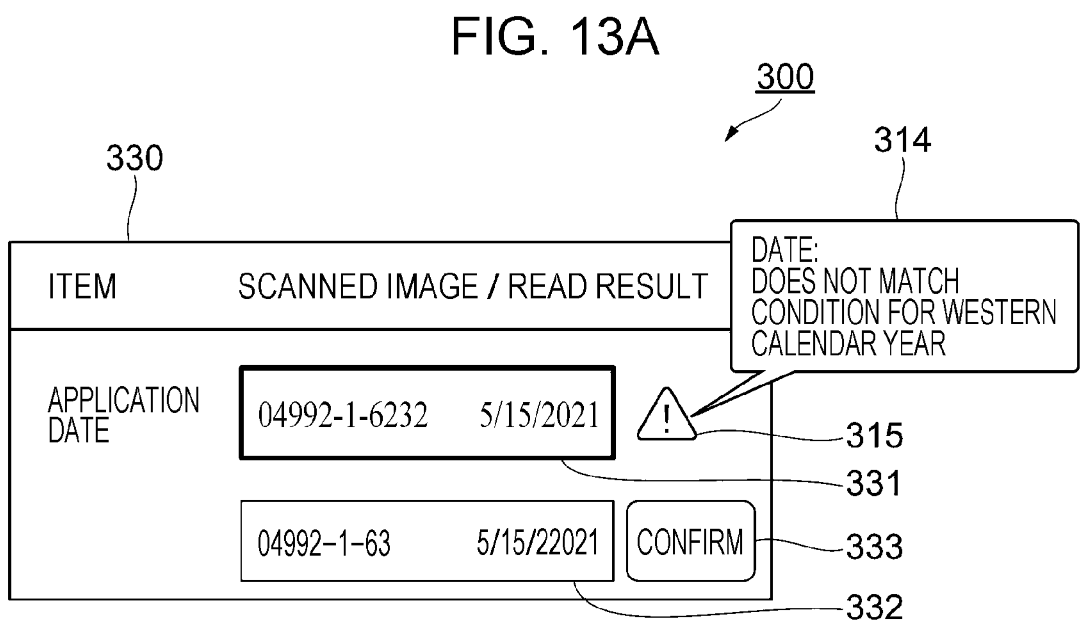
FIGS. 13A and 13B illustrate another example of the extraction-candidate display in accordance with this exemplary embodiment, FIG. 13A illustrating a state where an extraction candidate satisfies a specific condition, FIG. 13B illustrating a state where the extraction candidate has resolved the specific condition.
Figure 13B:
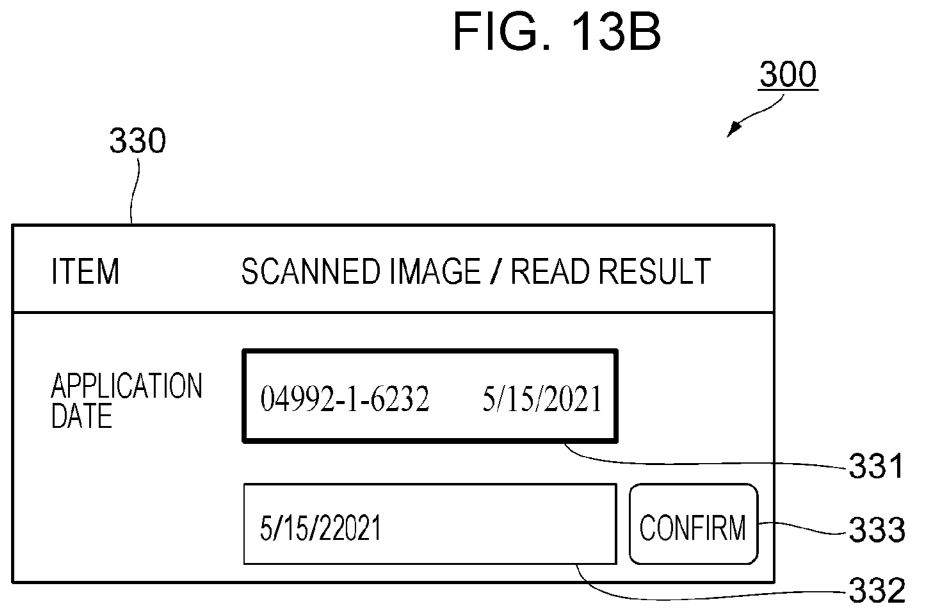

FIGS. 13A and 13B illustrate another example of the extraction-candidate display in accordance with this exemplary embodiment. Specifically, FIG. 13A illustrates a state where an extraction candidate satisfies a specific condition, and FIG. 13B illustrates a state where the extraction candidate has resolved the specific condition.

The example in FIGS. 13A and 13B relates to a case where information related to an extraction candidate at priority level 4 is displayed on the detailed screen 330.

In the display example in FIG. 13A, a reference image 314 and a warning image 315 are displayed on the detailed screen 330 displaying information related to an extraction candidate not satisfying all of extraction conditions.

Although the extraction candidate corresponding to the item "application date" displayed on the detailed screen 330 is a numerical value, the extraction candidate does not satisfy the extraction condition "recorded information of Western calendar year is set as value" set for the item.

It is assumed that the user corrects the text data of the extraction candidate shown in FIG. 13A in the output field 332, as shown in FIG. 13B.

In the display example in FIG. 13B, the extraction candidate corresponding to the item "application date" displayed on the detailed screen 330 satisfies the extraction condition "recorded information of Western calendar year is set as value" set for the item. In this case, the reference image 314 indicating a non-achieved condition and the warning image 315 displayed when a specific condition is satisfied are not displayed.

As an alternative to the extraction-candidate display in which one extraction candidate is displayed on the detailed screen 330, multiple extraction candidates may be displayed on the detailed screen 330.

Figure 14:
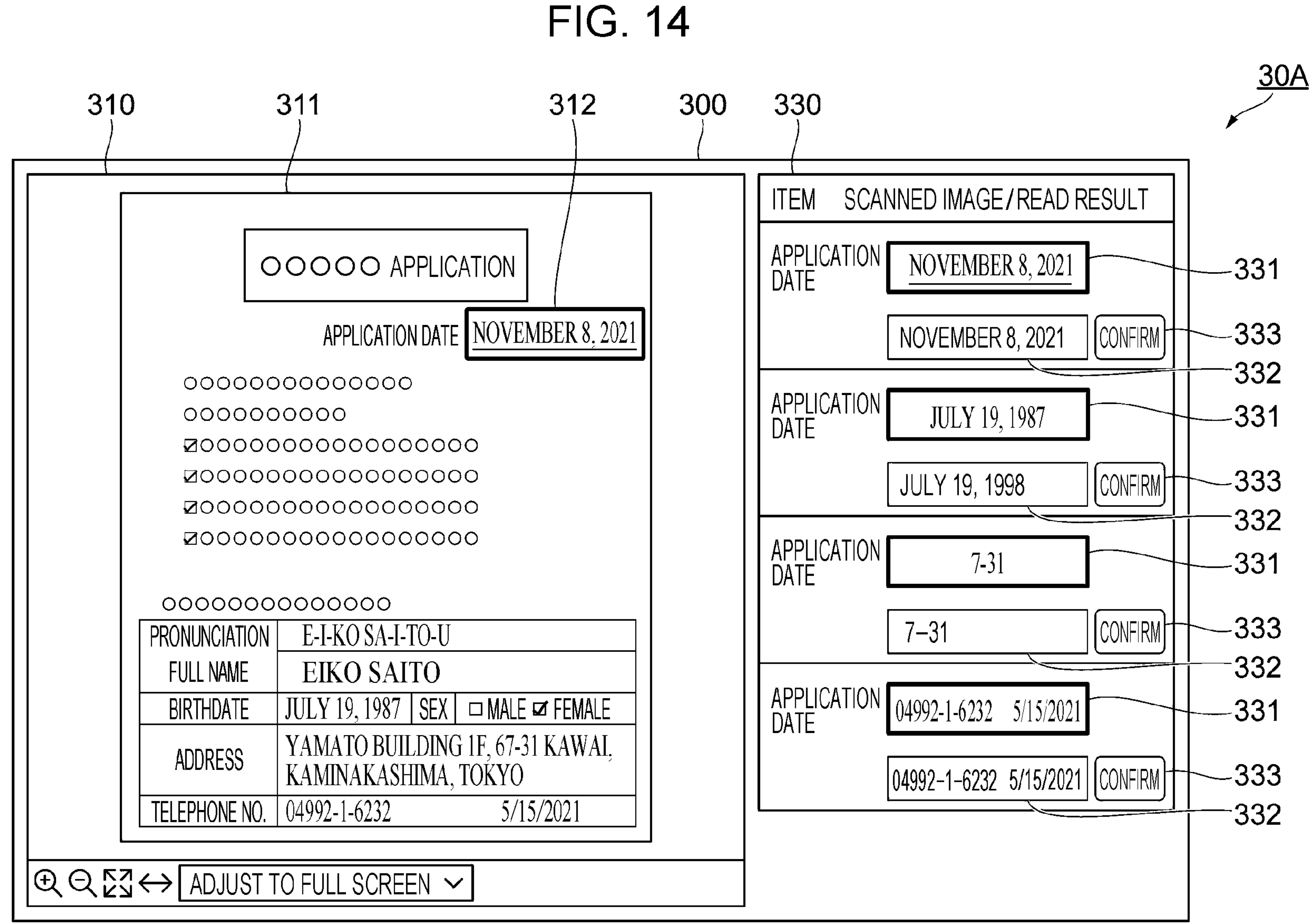
FIG. 14 illustrates another example of the extraction-candidate display in accordance with this exemplary embodiment.

FIG. 14 illustrates another example of the extraction-candidate display in accordance with this exemplary embodiment, and shows an example where the detailed screen 330 is displayed for presenting information related to multiple extraction candidates to the user.

In the display example shown in FIG. 14, a cursor 200 indicating, for example, a position or an image on the operation screen 300 is displayed thereon. The cursor 200 moves in accordance with a user operation input via an input unit, and is displayed to indicate, for example, a position or an image designated on the screen by the user.

In the display example shown in FIG. 14, the detailed screen 330 displays the partial image 331, the output field 332, and the confirm button image 333 for each extraction candidate.

For example, the multiple extraction candidates are displayed on the detailed screen 330 in a sequence according to the allocated priority levels.

Alternatively, for example, the multiple extraction candidates may be displayed on the detailed screen 330 in a sequence according to the recorded areas on the preview image 311.

Furthermore, in the display example shown in FIG. 14, when the cursor 200 is positioned in a region displaying information related to one of the extraction candidates on the detailed screen 330, a highlight image 312 indicating an extracted region of the one extraction candidate is displayed. In other words, when the user designates the region displaying the information related to the one extraction candidate, a highlight image 312 indicating the extracted region of the one extraction candidate is displayed.

Accordingly, a situation where the display of the preview image 311 becomes complex depending on the extraction-candidate-related display may be suppressed, as compared with a case where the contents of the extraction candidates are all displayed.

Furthermore, in the extraction-candidate display, the user may indicate whether the detailed screen 330 is to indicate one extraction candidate alone or multiple extraction candidates.

Figure 15:
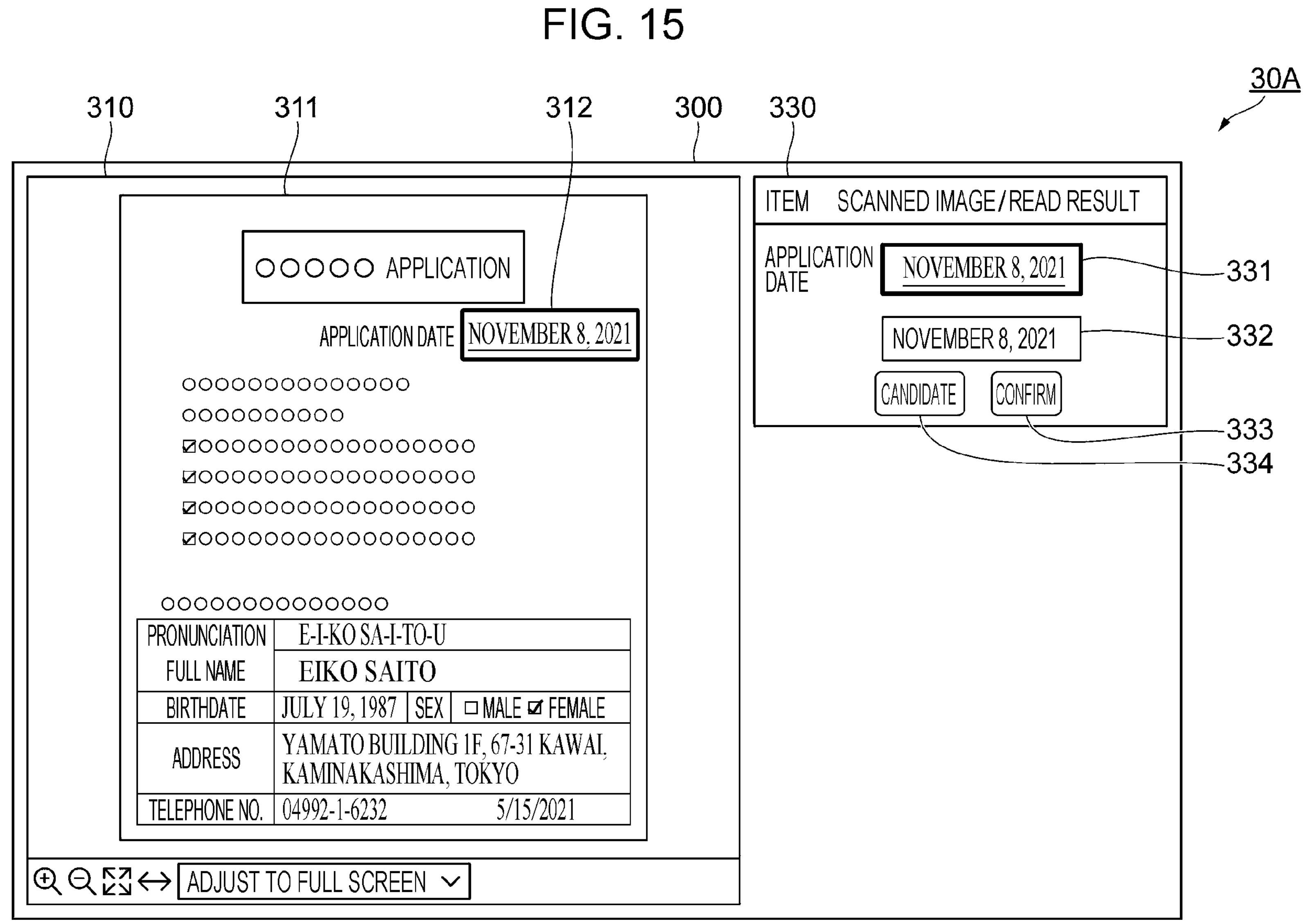
FIG. 15 illustrates another example of the extraction-candidate display in accordance with this exemplary embodiment.

FIG. 15 illustrates another example of the extraction-candidate display in accordance with this exemplary embodiment, and shows an example where a command for causing the detailed screen 330 to display information related to multiple extraction candidates is received from the user.

In the display example shown in FIG. 15, the detailed screen 330 displays a candidate button image 334 in addition to the partial image 331, the output field 332, and the confirm button image 333.

The candidate button image 334 receives, from the user, a command for causing the detailed screen 330 to display multiple extraction candidates. When the candidate button image 334 is selected by the user, the multiple extraction candidates are displayed on the detailed screen 330, as shown in FIG. 14.

In detail, for example, when the user selects the candidate button image 334 on the detailed screen 330 displaying information related to an extraction candidate at priority level 1, information related to extraction candidates at priority level 2 and onward is also displayed on the detailed screen 330.

Process for Correcting Extraction Candidate

A processing example where the user makes a request for correcting an extraction candidate will now be described.

Figure 16:
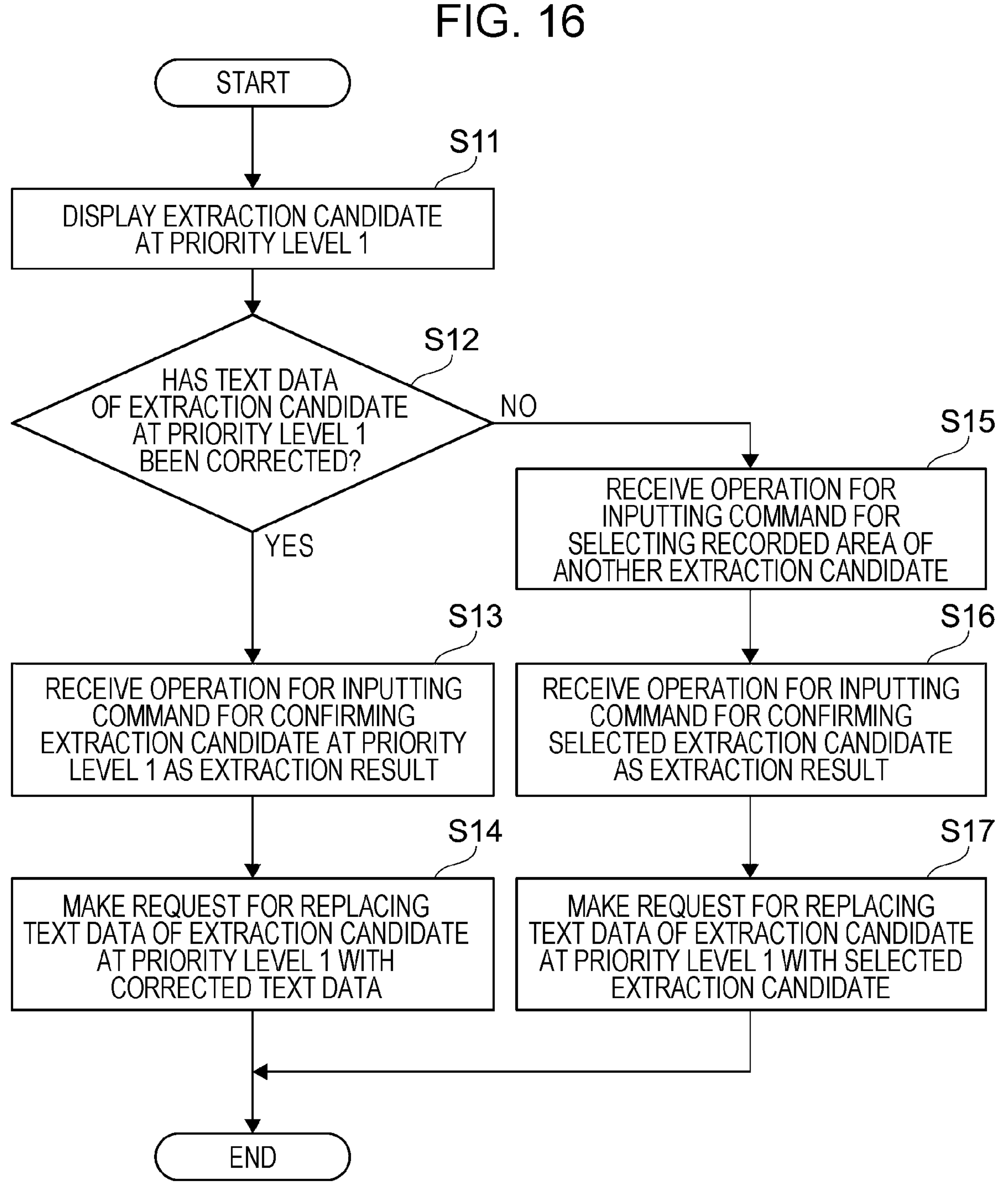
FIG. 16 is a flowchart illustrating the flow of a process where the user terminal according to this exemplary embodiment makes a request for correcting an extraction candidate.

FIG. 16 is a flowchart illustrating the flow of a process where the user terminal 30 according to this exemplary embodiment makes a request for correcting an extraction candidate.

The example in FIG. 16 relates to a case where the user inputs a correction command to the user terminal 30 instead of directly setting an extraction candidate at priority level 1 extracted from atypical-document image data as an extraction result.

In step 511, the display controller 302 of the user terminal 30 displays the extraction candidate at priority level 1 on the display 30A.

In detail, the display controller 302 displays text data related to the value of the extraction candidate at priority level 1 and the recorded area thereof on the display 30A.

In step S12, the operation determining unit 301 of the user terminal 30 determines whether or not the text data of the extraction candidate at priority level 1 has been corrected. In other words, it is determined whether or not a user operation for inputting a command for correcting the text data of the extraction candidate at priority level 1 has been performed.

In detail, if the output field 332 of the detailed screen 330 shown in FIG. 8 receives an input from the user, the operation determining unit 301 determines that a user operation for inputting a command for correcting the text data of the extraction candidate at priority level 1 has been performed.

If the text data of the extraction candidate at priority level 1 has been corrected (YES in step S12), the operation determining unit 301 of the user terminal 30 determines in step S13 that a user operation for inputting a command for confirming the corrected extraction candidate at priority level 1 as an extraction result has been received.

In detail, if the confirm button image 333 in the detailed screen 330 shown in FIG. 8 is selected by the user, the operation determining unit 301 determines that the corrected extraction candidate at priority level 1 is confirmed as an extraction result.

The communication controller 304 of the user terminal 30 requests the OCR processing server 10 to replace the text data of the extraction candidate at priority level 1 with the corrected text data in step S14, and ends the process. In other words, the communication controller 304 requests the OCR processing server 10 to set the extraction candidate at priority level 1 with the corrected text data as an extraction result.

If the text data of the extraction candidate at priority level 1 has not been corrected in step S12 (NO in step S12), the operation determining unit 301 of the user terminal 30 determines in step S15 that a user operation for inputting a command for selecting the recorded area of another extraction candidate different from the extraction candidate at priority level 1 has been received.

In detail, if the recorded area of another extraction candidate on the atypical-document preview image 311 shown in FIG. 8 is selected by the user, the operation determining unit 301 determines that this extraction candidate has been selected as an extraction candidate at priority level 1.

Then, in step S16, the operation determining unit 301 of the user terminal 30 determines that a user operation for inputting a command for confirming the selected extraction candidate as an extraction result has been received.

The communication controller 304 of the user terminal 30 requests the OCR processing server 10 to replace the extraction candidate at priority level 1 with the selected extraction candidate in step S17, and ends the process. In other words, the communication controller 304 requests the OCR processing server 10 to change the selected extraction candidate to priority level 1 and set the selected extraction candidate as an extraction result.

Process for Learning Extraction Result

A processing example involving learning an extraction result confirmed after presenting an extraction candidate will now be described.

Figure 17:
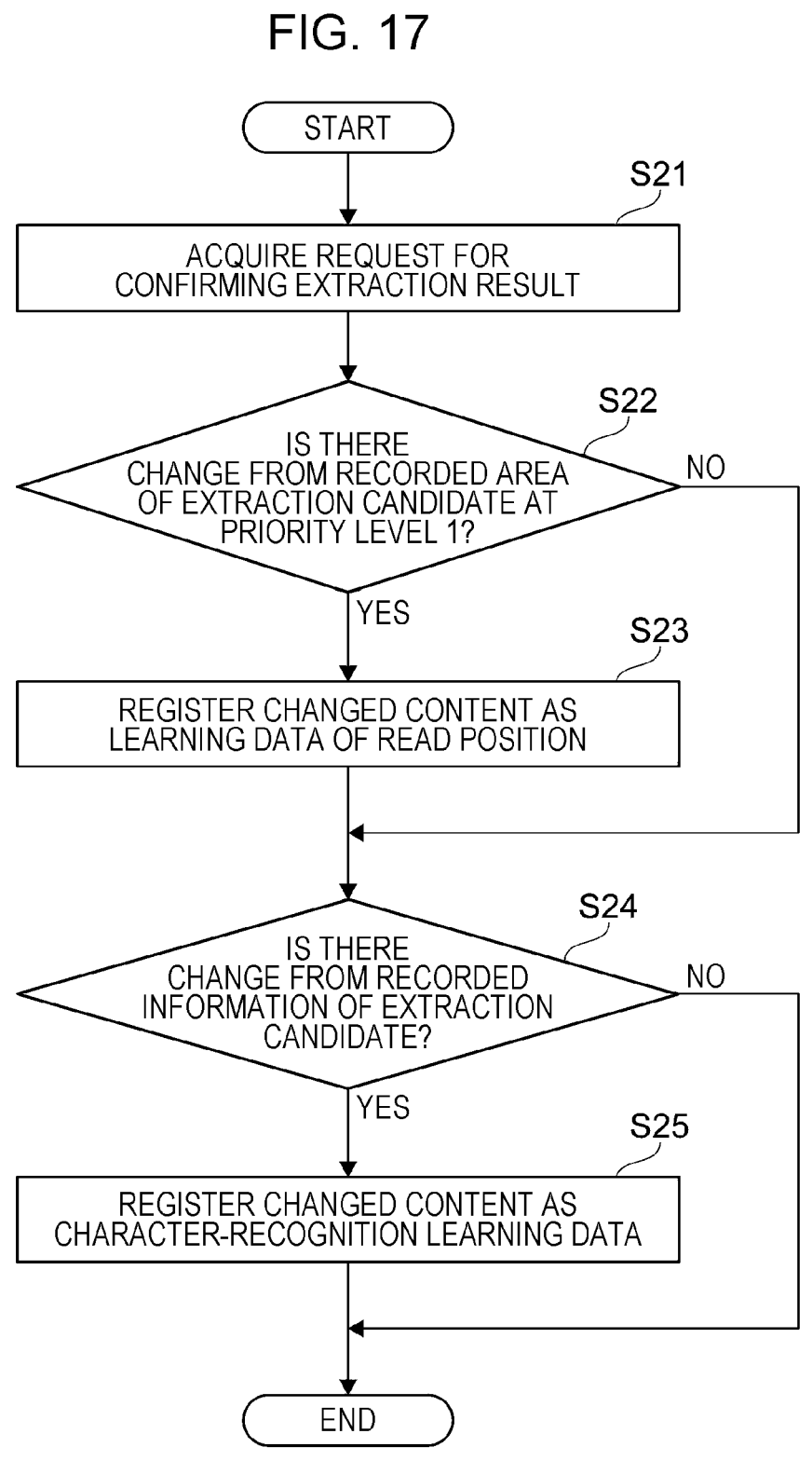

FIG. 17 is a flowchart illustrating the flow of a process where the OCR processing server 10 according to this exemplary embodiment learns an extraction result.

The example in FIG. 17 relates to a case where the extraction result is confirmed after the extraction candidate at priority level 1 is corrected.

In step S21, the request-information acquiring unit 102 of the OCR processing server 10 acquires, from the user terminal 30, request information for confirming the extraction result with respect to OCR processing of the atypical-document image data acquired by the atypical-document acquiring unit 101.

If request information for confirming the extraction result in accordance with the extraction candidate output as priority level 1 by the extraction-candidate output unit 105 is acquired, the extraction-result output unit 107 outputs the extraction candidate at priority level 1 as the extraction result obtained by the OCR processing unit 103. In contrast, if request information for confirming the extraction result in accordance with the extraction candidate corrected by the extraction-result correcting unit 106 is acquired, the extraction-result output unit 107 outputs the corrected extraction candidate as the extraction result obtained by the OCR processing unit 103.

In step S22, the extraction-result output unit 107 of the OCR processing server 10 identifies whether or not there is a change in the content output as the extraction result obtained by the OCR processing unit 103 from the recorded area of the extraction candidate at priority level 1.

An example of the case where there is a change from the recorded area of the extraction candidate at priority level 1 is a case where the region where the extraction candidate is to undergo key-value extraction has been changed while the recorded information of the extraction candidate at priority level 1 remains as-is. Other examples of the case where there is a change from the recorded area of the extraction candidate at priority level 1 include a case where another extraction candidate different from the extraction candidate at priority level 1 is selected and a case where a part other than an extraction candidate is set as the extraction result.

If there is a change in the content output as the extraction result obtained by the OCR processing unit 103 from the recorded area of the extraction candidate at priority level 1 (YES in step S22), the extraction-result output unit 107 of the OCR processing server 10 registers this changed content as learning data of a read position of the atypical document in step S23. In other words, the extraction-result output unit 107 stores, in the learning DB 110, the changed recorded area as learning data of the region where the extraction candidate corresponding to the item is to undergo key-value extraction.

In contrast, if there is no change in the content output as the extraction result obtained by the OCR processing unit 103 from the recorded area of the extraction candidate at priority level 1 (NO in step S22), the learning data of the region where the extraction candidate is to undergo key-value extraction is not registered.

In step S24, the extraction-result output unit 107 of the OCR processing server 10 identifies whether or not there is a change in the content output as the extraction result obtained by the OCR processing unit 103 from the recorded information of the extraction candidate.

An example of a case where there is a change from the recorded information of the extraction candidate is a case where the text data is corrected as a result of the output field 332 (see FIG. 8) receiving an input from the user.

If there is a change in the content output as the extraction result obtained by the OCR processing unit 103 from the recorded information of the extraction candidate (YES in step S24), the extraction-result output unit 107 of the OCR processing server 10 registers this changed content as character-recognition learning data in step S25, and ends the process. In other words, the extraction-result output unit 107 stores the changed recorded information in the learning DB 110 as character-recognition learning data of the atypical document, and ends the process.

In contrast, if there is no change in the content output as the extraction result obtained by the OCR processing unit 103 from the recorded information of the extraction candidate (NO in step S24), character-recognition learning data is not registered, and the process ends.

Accordingly, when the extraction candidate at priority level 1 is corrected, the accuracy of key-value extraction may be enhanced. Moreover, when the extraction candidate at priority level 1 is corrected, the accuracy of the character recognition process may be enhanced.

Although not described above, in this exemplary embodiment, the corrected extraction candidate may be output as the extraction result obtained by the OCR processing unit 103 even when the corrected text data or another selected extraction candidate does not satisfy all extraction conditions.

For example, learning data is registered such that a weight is added to an extraction condition matching a corrected extraction candidate among extraction conditions set for an item. Accordingly, a new extraction candidate may be acquired from a new atypical document based on the item, the extraction condition, and the weight of the extraction condition.

Process Performed when there is No Extraction Candidate

A processing example where an extraction candidate is not presented on the user terminal 30 will now be described.

Figure 18:
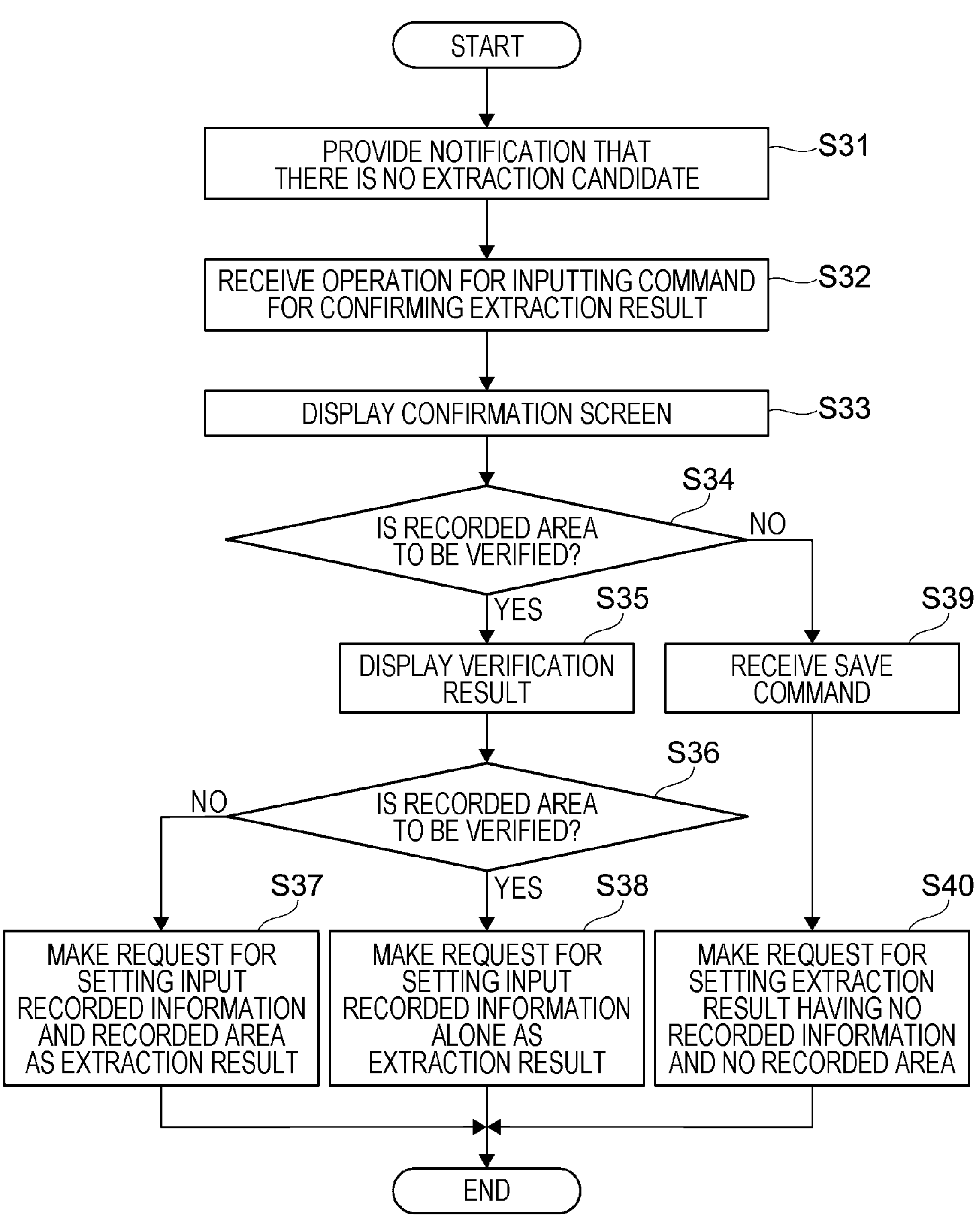
FIG. 18 is a flowchart illustrating the flow of a process where the user terminal according to this exemplary embodiment receives an extraction result.

FIG. 18 is a flowchart illustrating the flow of a process where the user terminal 30 according to this exemplary embodiment receives an extraction result.

The example in FIG. 18 relates to a case where an extraction candidate with respect to an item is not extracted from the atypical-document image data.

In step S31, the display controller 302 of the user terminal 30 notifies the user via the display 30A that there is no extraction candidate corresponding to an item.

In detail, for example, the display controller 302 displays, on the display 30A, a text message indicating that there is no extraction candidate. The notification indicating that there is no extraction candidate corresponding to the item may be provided by using sound or light instead of displaying an image.

The display for notifying the user that there is no extraction candidate corresponding to the item will now be described.

Figure 19:
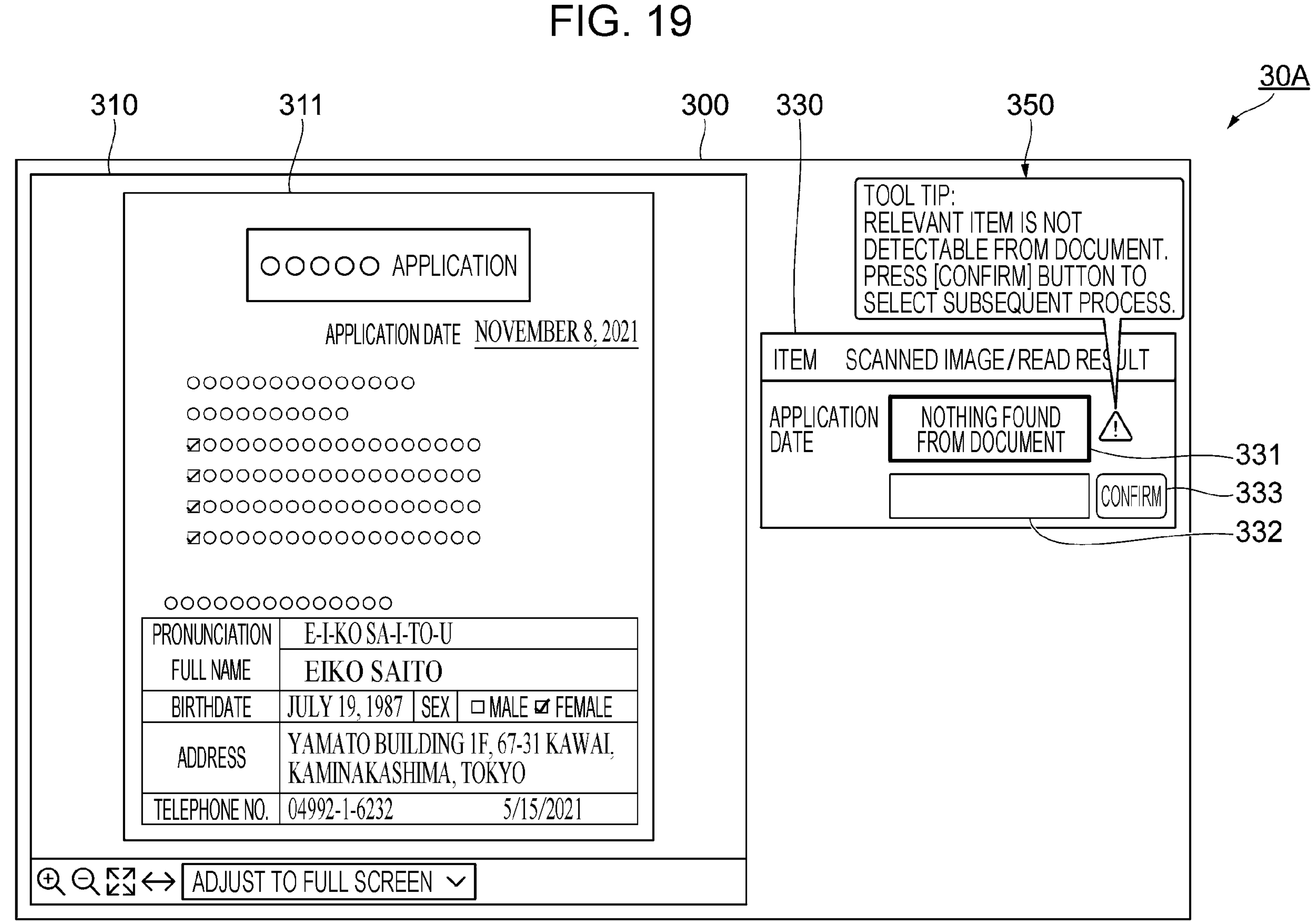
FIG. 19 illustrates another display example of the display of the user terminal according to this exemplary embodiment.

FIG. 19 illustrates another display example of the display 30A of the user terminal 30 according to this exemplary embodiment, and shows an example of a notification image used for notifying the user that there is no extraction candidate corresponding to the item.

The example in FIG. 19 relates to a case where an extraction candidate is not acquired even though key-value extraction has been executed with respect to the item "reception date".

In the display example shown in FIG. 19, the highlight images 312 (see FIG. 8) that highlight the recorded areas of extraction candidates are not displayed, but a notification image 350 for notifying the user that there is no extraction candidate corresponding to the item is displayed.

The notification image 350 is used for notifying the user that there is no extraction candidate corresponding to the item selected by the user. In detail, the notification image 350 provides a notification by using a text message indicating that there is no extraction candidate corresponding to the item selected by the user and the reason therefor.

Furthermore, as shown in FIG. 19, the notification image 350 may include a text message prompting the user to perform an operation.

In the display example shown in FIG. 19, since there is no extraction candidate corresponding to the item selected by the user, the region of the partial image 331 displays a text message "nothing found from document". Since there is no text data corresponding to a value, the output field 332 is blank.

The notification image 350 is displayed in association with the detailed screen 330. Furthermore, as shown in FIG. 19, the notification image 350 is displayed in combination with a graphic symbol.

For example, the notification image 350 may be displayed toward the center of the operation screen 300 or may be displayed using a graphic symbol alone.

In step S32, the operation determining unit 301 of the user terminal 30 determines that a user operation for inputting a command for confirming the extraction result has been received.

In detail, if the confirm button image 333 on the detailed screen 330 shown in FIG. 19 is selected by the user, the operation determining unit 301 determines that a user operation for inputting a command for confirming the extraction result has been received.

In step S33, the display controller 302 of the user terminal 30 displays, on the display 30A, a confirmation screen 370 (to be described later) for allowing the user to confirm the extraction result based on the user operation for inputting the command for confirming the extraction result.

The display for allowing the user to confirm the extraction result will now be described.

Figure 20:
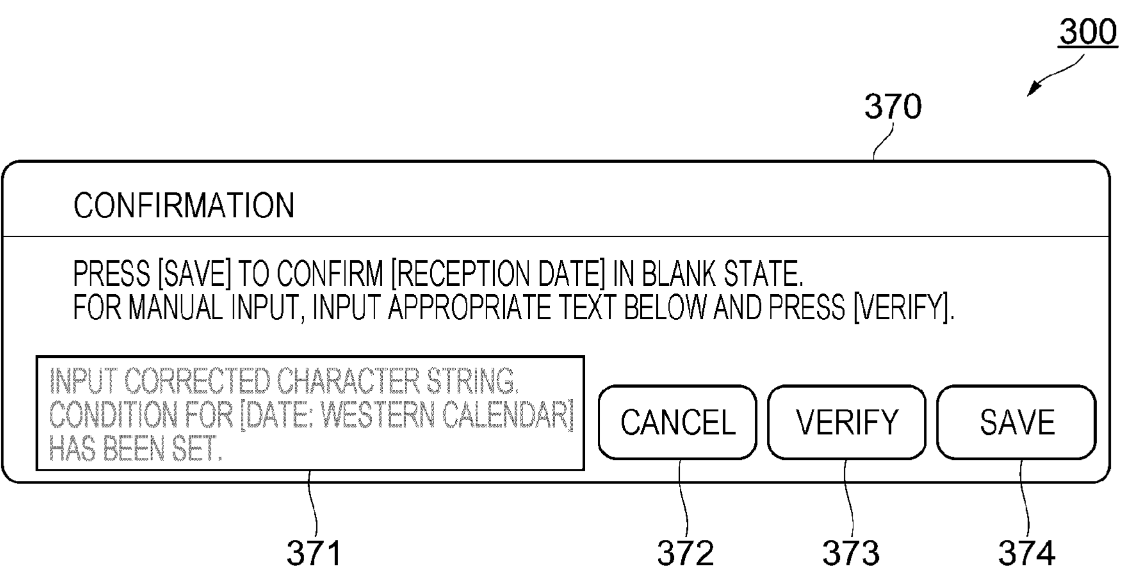
FIG. 20 illustrates an example of a confirmation screen according to this exemplary embodiment.

FIG. 20 illustrates an example of the confirmation screen 370 according to this exemplary embodiment.

The example in FIG. 20 relates to a case where a target item for key-value extraction is "reception date", and "date" and "Western calendar year" are set as extraction conditions.

If the user selects the confirm button image 333 in accordance with the text message of the notification image 350 in the display example shown in FIG. 19, the confirmation screen 370 for allowing the user to confirm the extraction result is displayed, as shown in FIG. 20.

The confirmation screen 370 receives, from the user, a command for confirming the extraction result based on a blank value corresponding to the item or a command for confirming the extraction result by filling in a value.

The confirmation screen 370 displays an input field 371, a cancel button image 372, a verify button image 373, and a save button image 374.

The input field 371 displays a text message prompting the user to input a value. The input field 371 also displays an extraction condition set for the target item for key-value extraction. The input field 371 may receive an input from the user so as to be filled with text data of a value.

The cancel button image 372 receives a user operation for inputting a command for cancelling the confirmation of the extraction result. When the cancel button image 372 is selected by the user, the confirmation screen 370 transitions to a non-displayed mode.

The verify button image 373 receives a user operation for inputting a command for verifying the recorded area of text data input to the input field 371 with respect to the atypical-document image data. In other words, the verify button image 373 receives, from the user, a command for detecting the recorded area near an area where a key is identifiable based on the recorded information of a value.

The save button image 374 receives, from the user, a command for saving a value corresponding to the item in a blank state.

In step S34, the operation determining unit 301 of the user terminal 30 determines whether or not the recorded area is to be verified. In other words, the operation determining unit 301 determines whether or not a user operation for inputting a command for verifying the recorded area has been performed.

In detail, if the verify button image 373 is selected by the user in a state where text data is input to the input field 371 in the confirmation screen 370 shown in FIG. 20, the operation determining unit 301 determines that the recorded area is to be verified.

If the recorded area is to be verified (YES in step S34), the display controller 302 of the user terminal 30 displays the verification result of the recorded area on the display 30A in step S35.

In detail, the display controller 302 displays an image of a section detected as the recorded area of the text data input to the input field 371 in the atypical document image within the region of the partial image 331 shown in FIG. 19. The output field 332 (see FIG. 19) displays the text data input to the input field 371.

If the recorded area of the text data input to the input field 371 is not detectable, the region of the partial image 331 may be grayed out, or a text message "not applicable" may be displayed in the region of the partial image 331.

In step S36, the operation determining unit 301 of the user terminal 30 determines whether or not the recorded area is to be set. In other words, the operation determining unit 301 determines whether or not a user operation for inputting a command for setting the recorded area has been performed.

In detail, if the confirm button image 333 is selected by the user in a state where a part of the atypical document image is displayed within the region of the partial image 331 shown in FIG. 19, the operation determining unit 301 determines that the recorded area is to be set. In contrast, if the confirm button image 333 is selected by the user in a state where a part of the atypical document image is not displayed within the region of the partial image 331, the operation determining unit 301 determines that the recorded area is not to be set.

If the verify button image 373 is selected in a state where text data is input to the input field 371 in the confirmation screen 370 shown in FIG. 20, it is determined that a user operation for inputting a command for verifying the recorded area has been performed.

If the recorded area is to be set (YES in step S36), the communication controller 304 of the user terminal 30 requests the OCR processing server 10 to set the input recorded information and recorded area as the extraction result corresponding to the item in step S37, and ends the process. In a case where the detected recorded area is set, this recorded area is registered as learning data of the region where the extraction candidate corresponding to the item is to undergo key-value extraction.

In contrast, if the recorded area is not to be set (NO in step S36), the communication controller 304 of the user terminal 30 requests the OCR processing server 10 to set the input recorded information alone as the extraction result corresponding to the item in step S38, and ends the process.

In this processing example, it is assumed that a command for saving the value corresponding to the item in a blank state is received from the user when the recorded area is not to be verified.

If the recorded area is not to be verified in step S34 (NO in step S34), the operation determining unit 301 of the user terminal 30 determines in step S39 that a user operation for a save command has been received.

In detail, if the save button image 374 is selected by the user in a state where the input field 371 is blank in the confirmation screen 370 shown in FIG. 20, the operation determining unit 301 determines that a command for saving the value corresponding to the item in a blank state has been received from the user.

Then, the communication controller 304 of the user terminal 30 requests the OCR processing server 10 to set an extraction result having no recorded information and no recorded area in step S40, and ends the process.

Modifications

As an alternative to the above example where an extraction candidate corresponding to one of the items selected by the user is displayed on the operation screen 300, for example, an extraction candidate corresponding to a related item related to one of the items may be displayed when the user corrects the extraction candidate corresponding to the one item.

Figure 21:
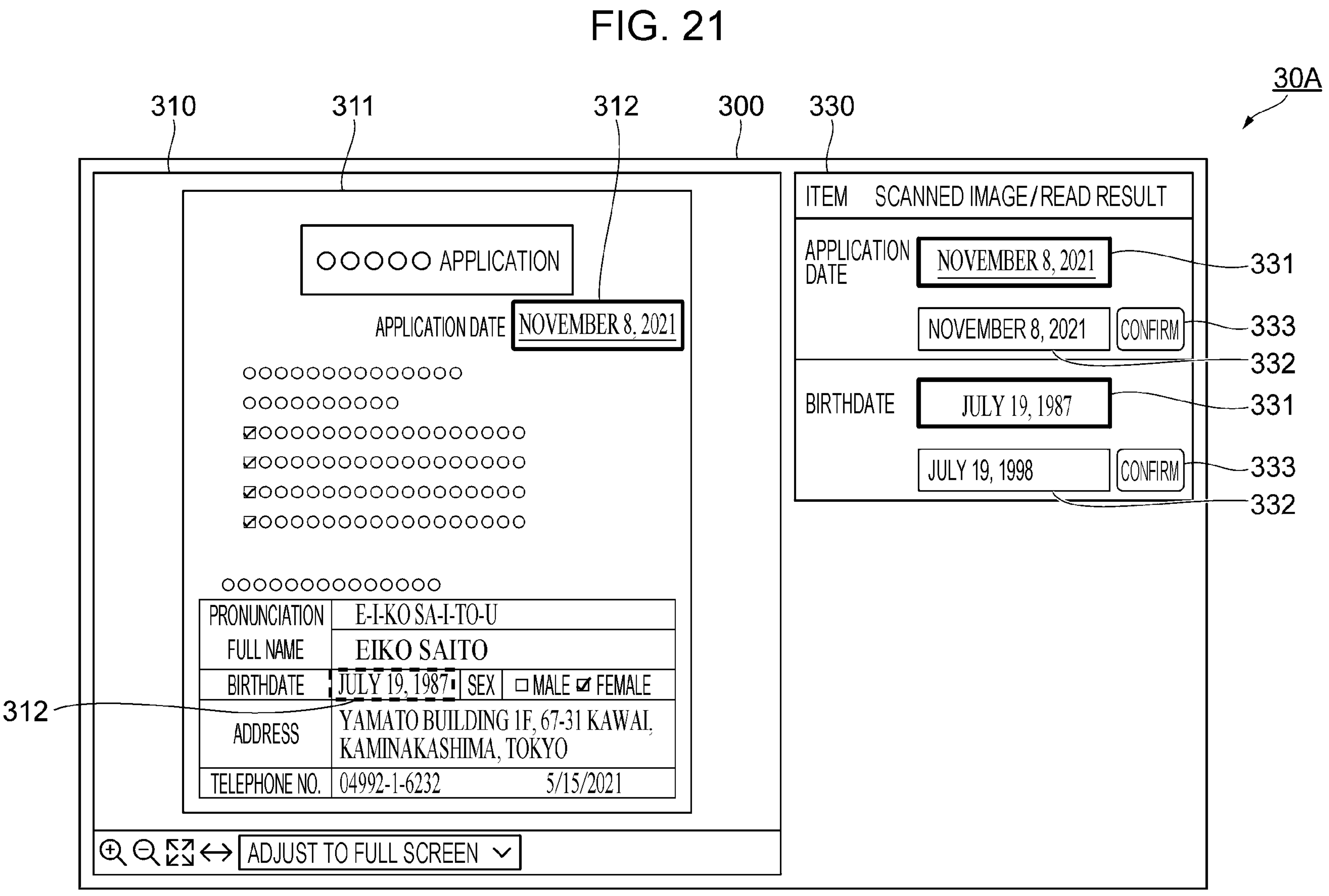
FIG. 21 illustrates another example of the extraction-candidate display in accordance with this exemplary embodiment.

FIG. 21 illustrates another example of the extraction-candidate display in accordance with this exemplary embodiment, and shows an example where an extraction candidate corresponding to a related item related to an item of a corrected extraction candidate is displayed.

The display example in FIG. 21 relates to a case where, in a state where an extraction candidate corresponding to the item "application date" has been corrected, the item "birthdate" is identified as a related item related to the item "application date".

Examples of the "related item" include an item with the same extraction condition set for each item and an item belonging to the same item category. In detail, the corrected item "application date" and the related item "birthdate" each indicate a date and share the same category for a value corresponding to a key.

In the display example in FIG. 21, the display mode is varied between the highlight image 312 indicating the recorded area of the item "application date" and the highlight image 312 indicating the recorded area of the item "birthdate".

The program executed by the CPU 11*a* serving as an example of a processor in each exemplary embodiment is provided to the controller 11 by being stored in a computer readable storage medium, such as a magnetic recording medium (e.g., a magnetic tape or a magnetic disk), an optical storage medium (e.g., an optical disk), a magneto-optical storage medium, or a semiconductor memory. Alternatively, the program executed by the CPU 11*a* may be downloaded to each of the OCR processing server 10 and the user terminal 30 by using a communication unit, such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The process performed by the information processing system in each exemplary embodiment is prepared as, for example, a program, such as application software. This program may be provided via a communication unit or may be provided by being stored in a storage medium, such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing system comprising:

at least one processor configured to:

acquire an extraction candidate from recorded information serving as information recorded in an atypical document, the extraction candidate serving as a candidate to be extracted as the recorded information corresponding to an item of the atypical document; and display a recorded area on a display, the recorded area being where the extraction candidate is recorded in the atypical document.

(((2)))

The information processing system according to (((1))), wherein the at least one processor is configured to acquire the extraction candidate from the recorded information in the atypical document based on a recorded content of the item with respect to the recorded information to be extracted.

(((3)))

The information processing system according to (((1))) or (((2))), wherein the at least one processor is configured to:

acquire the extraction candidate from the recorded information in the atypical document based on the item and an extraction condition set for the item; and display the recorded area of the extraction candidate on the display based on an achievement status of the extraction condition.

(((4)))

The information processing system according to (((3))), wherein the at least one processor is configured to display a priority level on the display together with the recorded area of the extraction candidate, the priority level being allocated to the extraction candidate based on the achievement status.

(((5)))

The information processing system according to (((3))), wherein the at least one processor is configured to display a reason for a priority level on the display together with the recorded area of the extraction candidate, the priority level being allocated to the extraction candidate based on the achievement status.

(((6)))

The information processing system according to (((3))), wherein the at least one processor is configured to:

acquire a plurality of the extraction candidates from the recorded information in the atypical document based on the item and the extraction condition set for the item; and vary a display mode for the recorded areas of the extraction candidates between a first candidate that has most achieved the extraction condition and a second candidate, the first candidate and the second candidate being included in the plurality of extraction candidates.

(((7)))

The information processing system according to any one of (((1))) to (((6))), wherein the at least one processor is configured to display the recorded area of the extraction candidate in an image of the atypical document.

(((8)))

The information processing system according to (((7))), wherein the at least one processor is configured to:

acquire a plurality of the extraction candidates from the recorded information in the atypical document; and display the recorded area of the extraction candidate designated by a user from the plurality of extraction candidates in the image of the atypical document.

(((9)))

The information processing system according to any one of (((1))) to (((8))), wherein the at least one processor is configured to set the extraction candidate selected by a user as an extraction result of the recorded information corresponding to the item in a case where the at least one processor receives a selection of the extraction candidate made by the user.

(((10)))

The information processing system according to (((9))), wherein the at least one processor is configured to learn the recorded area of the selected extraction candidate as the recorded area of the recorded information corresponding to the item.

(((11)))

The information processing system according to any one of (((1))) to (((8))), wherein the at least one processor is configured to:

set the recorded information corresponding to the item input by a user as an extraction result of the recorded information corresponding to the item in a case where the at least one processor receives an input of the recorded information corresponding to the item from the user; and detect the recorded area where the input recorded information is recorded within an image of the atypical document.

(((12)))

The information processing system according to (((11))), wherein the at least one processor is configured to learn the detected recorded area as the recorded area of the recorded information corresponding to the item.

(((13)))

The information processing system according to any one of (((1))) to (((8))), wherein the at least one processor is configured to:

acquire the extraction candidate based on the item and an extraction condition set for the item;

correct the extraction candidate based on a correction command from a user; and set the corrected extraction candidate as an extraction result of the recorded information corresponding to the item even in a case where the corrected extraction candidate does not entirely satisfy the extraction condition.

(((14)))

The information processing system according to (((13))), wherein the at least one processor is configured to cause the display to display a notification to notify a user that the corrected extraction candidate does not entirely satisfy the extraction condition.

(((15)))

The information processing system according to (((13))), wherein the at least one processor is configured to:

add a weight to an extraction condition that is included in the extraction condition and that matches the corrected extraction candidate; and acquire a new extraction candidate from a new atypical document based on the item, the extraction condition, and the weight of the extraction condition.

(((16)))

A program causing a computer to execute a process comprising:

acquiring an extraction candidate from recorded information serving as information recorded in an atypical document, the extraction candidate serving as a candidate to be extracted as the recorded information corresponding to an item of the atypical document; and causing a display to display a recorded area where the extraction candidate is recorded in the atypical document.

What is claimed is:

1. An information processing system comprising:

at least one processor configured to:

cause a display to display a setting screen that receives, from a user, a command for setting an item to be extracted from an atypical document and an extraction condition for the item;

perform optical character recognition ("OCR") processing on image data of the atypical document based on the extraction condition;

acquire, from the image data and based on a result of the OCR processing, an extraction candidate from recorded information serving as information recorded in the atypical document, the extraction candidate serving as a candidate to be extracted as the recorded information corresponding to the item set by the user; and display a recorded area on the display, the recorded area being where the extraction candidate is recorded in the atypical document, wherein the at least one processor is further configured to:

acquire the extraction candidate based on the item and the set extraction condition;

correct the extraction candidate based on a correction command from the user input by way of the display; and set the corrected extraction candidate as an extraction result of the recorded information corresponding to the item even in a case where the corrected extraction candidate does not entirely satisfy the extraction condition.

2. The information processing system according to claim 1, wherein the at least one processor is configured to acquire the extraction candidate from the recorded information in the atypical document based on a recorded content of the item with respect to the recorded information to be extracted.

3. The information processing system according to claim 1, wherein the at least one processor is configured to display the recorded area of the extraction candidate on the display based on an achievement status of the extraction condition.

4. The information processing system according to claim 3, wherein the at least one processor is configured to display a priority level on the display together with the recorded area of the extraction candidate, the priority level being allocated to the extraction candidate based on the achievement status.

5. The information processing system according to claim 3, wherein the at least one processor is configured to display a reason for a priority level on the display together with the recorded area of the extraction candidate, the priority level being allocated to the extraction candidate based on the achievement status.

6. The information processing system according to claim 3, wherein the at least one processor is configured to:

acquire a plurality of the extraction candidates from the recorded information in the atypical document based on the item and the extraction condition set for the item; and vary a display mode for the recorded areas of the extraction candidates between a first candidate that has most achieved the extraction condition and a second candidate, the first candidate and the second candidate being included in the plurality of extraction candidates.

7. The information processing system according to claim 1, wherein the at least one processor is configured to display the recorded area of the extraction candidate in an image of the atypical document.

8. The information processing system according to claim 7, wherein the at least one processor is configured to:

acquire a plurality of the extraction candidates from the recorded information in the atypical document; and display the recorded area of the extraction candidate designated by the user from the plurality of extraction candidates in the image of the atypical document.

9. The information processing system according to claim 1, wherein the at least one processor is configured to set the extraction candidate selected by the user as the extraction result of the recorded information corresponding to the item in a case where the at least one processor receives a selection of the extraction candidate made by the user.

10. The information processing system according to claim 9, wherein the at least one processor is configured to learn the recorded area of the selected extraction candidate as the recorded area of the recorded information corresponding to the item.

11. The information processing system according to claim 1, wherein the at least one processor is configured to:

set the recorded information corresponding to the item input by the user as the extraction result of the recorded information corresponding to the item in a case where the at least one processor receives an input of the recorded information corresponding to the item from the user; and detect the recorded area where the input recorded information is recorded within an image of the atypical document.

12. The information processing system according to claim 11, wherein the at least one processor is configured to learn the detected recorded area as the recorded area of the recorded information corresponding to the item.

13. The information processing system according to claim 1, wherein the at least one processor is configured to cause the display to display a notification to notify the user that the corrected extraction candidate does not entirely satisfy the extraction condition.

14. The information processing system according to claim 1, wherein the at least one processor is configured to:

add a weight to an extraction condition that is included in the extraction condition and that matches the corrected extraction candidate; and acquire a new extraction candidate from a new atypical document based on the item, the extraction condition, and the weight of the extraction condition.

15. A non-transitory computer readable medium storing a program causing a computer to execute a process, the process comprising:

causing a display to display a setting screen that receives, from a user, a command for setting an item to be extracted from an atypical document and an extraction condition for the item;

performing optical-character-recognition ("OCR") processing on image data of the atypical document based on the extraction condition;

acquiring, from the image data and based on a result of the OCR processing, an extraction candidate from recorded information serving as information recorded in the atypical document, the extraction candidate serving as a candidate to be extracted as the recorded information corresponding to the item set by the user; and causing the display to display a recorded area where the extraction candidate is recorded in the atypical document, wherein the process further comprise:

acquiring the extraction candidate based on the item and the set extraction condition;

correcting the extraction candidate based on a correction command from the user input by way of the display; and setting the corrected extraction candidate as an extraction result of the recorded information corresponding to the item even in a case where the corrected extraction candidate does not entirely satisfy the extraction condition.

16. An information processing method comprising:

causing a display to display a setting screen that receives, from a user, a command for setting an item to be extracted from an atypical document and an extraction condition for the item;

performing optical-character-recognition ("OCR") processing on image data of the atypical document based on the extraction condition;

acquiring, from the image data and based on a result of the OCR processing, an extraction candidate from recorded information serving as information recorded in the atypical document, the extraction candidate serving as a candidate to be extracted as the recorded information corresponding to the item set by the user; and causing the display to display a recorded area where the extraction candidate is recorded in the atypical document, wherein the method further comprise:

acquiring the extraction candidate based on the item and the set extraction condition;

correcting the extraction candidate based on a correction command from the user input by way of the display; and setting the corrected extraction candidate as an extraction result of the recorded information corresponding to the item even in a case where the corrected extraction candidate does not entirely satisfy the extraction condition.

* * * * *